United States Patent
Watanabe

(10) Patent No.: US 6,678,235 B1
(45) Date of Patent: Jan. 13, 2004

(54) CLV OPTICAL DISC, CLV OPTICAL DISC FORMAT, AND AN OPTICAL DISC MEDIUM RECORDING AND REPRODUCTION APPARATUS

(75) Inventor: Hisao Watanabe, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/527,848

(22) Filed: Mar. 17, 2000

(30) Foreign Application Priority Data

| Mar. 17, 1999 | (JP) | 11-071499 |
| Jun. 8, 1999 | (JP) | 11-160976 |
| Nov. 18, 1999 | (JP) | 11-327643 |

(51) Int. Cl.$^7$ .............................................. G11B 7/00
(52) U.S. Cl. .................................. 369/275.3; 369/275.4
(58) Field of Search .............................. 369/44.26, 13.55, 369/44.27, 44.37, 275.1, 275.3, 275.4

(56) References Cited

U.S. PATENT DOCUMENTS

| 5,345,435 A | * | 9/1994 | Yamasaki | 369/275.3 |
| 5,751,689 A | * | 5/1998 | Hoshino et al. | 369/275.3 |
| 5,844,883 A | * | 12/1998 | Kanno et al. | 369/53.29 |
| 6,028,828 A | * | 2/2000 | Maeda | 369/47.4 |
| 6,452,898 B1 | * | 9/2002 | Watanabe | 369/275.3 |

FOREIGN PATENT DOCUMENTS

| JP | 9-223362 | 8/1997 |

* cited by examiner

Primary Examiner—Thang V. Tran
Assistant Examiner—Bach Vuong
(74) Attorney, Agent, or Firm—Oblon, Spivak, McClelland, Maier & Neustadt, P.C.

(57) ABSTRACT

A CLV optical disc capable of recording the information with a constant linear velocity. In the CLV optical disc, plural lines of specified track exist in the predetermined data area, railroad length of the tracks is integer times of the length of a sector, the length of the sector on the specified tracks is $2 \times \pi \times N$ times of a track pitch, the number N is a positive integral number, and head positions of the specified tracks are lined up on a predetermined radius line A–A' at equal track intervals. Fixed-length track marks are arranged at equal physical length intervals along the information track formed in the state of a spiral. The track position information is obtained by detecting the track marks of the present and adjacent tracks. The CLV optical disc medium recording/reproducing apparatus can perform the seeking operation by use of the CPU and the other relevant units regardless of the operation of controlling the disc revolution number. In the CLV optical disc master board exposure, the CLV drive ordering pulse creating method can be realized by the spindle rotation ordering pulse train and the slider movement ordering pulse train.

28 Claims, 25 Drawing Sheets

SECTOR; ARRANGED ON RADIUS LINE

SECTOR; ARRANGED PER EACH OF RESPECTIVE ZONES

ZONES

FREQUENCY DEMULTIPLYING METHOD OF MIXING INTERCALARY PULSES

TABLE 1

| TRACK No. | $L_{cb}$ NUMBER PER ONE TRACK (INTEGER PART) | REMAINING DIFFERENCE OF TRACK (DECIMAL FRACTION PART) |
|---|---|---|
| m | Ntm | |
| m+1 | Ntm + Npa | + α |
| m+2 | Ntm + 2 x Npa | + 2 x α |
| m+3 | Ntm + 3 x Npa + 1 | + 0.3 x α |
| m+4 | Ntm + 4 x Npa | + 1.3 x α |
| --- | --- | --- |

FIG. 23

TABLE 2

| TRACK No. | $L_{cb}$ NUMBER PER ONE TRACK (INTEGER PART) | REMAINING DIFFERENCE OF TRACK (DECIMAL FRACTION PART) |
|---|---|---|
| s | Nsg | |
| s+1 | Nsg + Npb | + β |
| s+2 | Nsg + 2 Npb | + 2 x β |
| s+3 | Nsg + 3 Npb + 1 | + 0.3 x β |
| s+4 | Nsg + 4 Npb | + 1.3 x β |
| --- | --- | --- |

FIG. 24

TABLE 3

| STATE OF CLV DRIVE | EXPOSURE RADIUS POSITION | SPINDLE DRIVE ORDERING PULSE | SLIDER DRIVE ORDERING PULSE |
|---|---|---|---|
| STOP | $R_0$ | $N_0 \rightarrow N_{sp}$ | $N_0 \rightarrow n_{sl}$ |
| CLV DRIVE (TRACK 1) | $\sim R_0 + P$ | $N_0 + N_p \rightarrow N_{sp}$ | $N_0 + N_p \rightarrow n_{sl}$ |
| CLV DRIVE (TRACK 2) | $\sim R_0 + 2P$ | $N_0 + 3N_p \rightarrow N_{sp}$ | $N_0 + 3N_p \rightarrow n_{sl}$ |
| CLV DRIVE (TRACK 3) | $\sim R_0 + 3P$ | $N_0 + 5N_p \rightarrow N_{sp}$ | $N_0 + 5N_p \rightarrow n_{sl}$ |
| --- | --- | --- $\rightarrow$ --- | --- $\rightarrow$ --- |

FIG. 25

CLV OPTICAL DISC, CLV OPTICAL DISC FORMAT, AND AN OPTICAL DISC MEDIUM RECORDING AND REPRODUCTION APPARATUS

BACKGROUND OF THE INVENTION

1. Field of the Invention

The present invention relates to a CLV (Constant Linear Velocity) disc applied to optical disc medium, a format of the above-mentioned CLV optical disc, and an optical disc medium recording and reproducing apparatus, in particular, the CLV disc and the CLV disc format in the large capacitance optical disc apparatus capable of recording and reproducing the information on the optical disc medium.

2. Discussion of the Background

In order to raise the speed of accessing the information recorded on the optical disc media, it is necessary to control the speed of moving the optical head precisely and with high speed. When the optical disc apparatus receives the indication of accessing the information from the upper-ranked apparatus, the optical disc apparatus calculates the relationship between the logical number of the information and the physical position as shown by the track number or the sector number on the optical disc, and the apparatus sends the optical head to the above-mentioned physical position.

Hereupon, as to such optical disc, there exist two types of recording method; those are, a CAV (Constant Angular Velocity) type recording method in which the angular velocity is constant and a CLV (Constant Linear Velocity) type recording method in which the linear velocity is constant.

In the CAV type method, since the amount of the information on one track is always constant regardless of the inner and outer circumferences of the disc, the logical information number and the track number (numerical value) can be easily calculatively converted from each other, and thereby the calculation thereof can be done in a very short time. However, according to such CAV type method, there arises a problem that the line density of the information at the outer circumference of the disc is lowered and thereby the entire memorizing capacity is lowered. In order to avoid such unfavorable problem, in a method called "modified CAV type method", it is devised that the frequency of the recording signal is raised at the outer circumferential portion of the disc for the purpose of making uniform the line density on the respective inner and outer circumferential portions. However, in such way as mentioned above, there arises another problem that the structure of the formatter electric circuit becomes complicated.

From the viewpoint of the memorizing capacity and the simplification of the formatter electric circuit, the CLV type method is more preferable than the CAV type method. However, in the CLV type method, the amount of the information on one track differs in accordance with the radius position on the disc, and the calculative conversion between the information number and the physical position may become further complicated. As a result, the calculation of conversion therebetween cannot be done in a short time, and thereby, the access time may be elongated. Those matters are the problems of the CLV type method to be solved.

In recent years, as large-capacity optical disc media, DVD-ROM, DVD-R, and DVD-RAM, etc. have become popular, the requirement of increasing the memory capacity of these media continues to grow. Namely, it is desirable that the pitch be narrowed more and more and that the bit is made smaller. In such a situation, providing high-speed access to such an increased large-capacity media has become an important problem to be solved.

In order to solve the above mentioned problem, the published specification of Japanese Laid-Open Patent Publication No. 9-16980 filed by Nihon-Denki Co., Ltd. entitled, "A METHOD OF ACCESSING THE INFORMATION OF THE CLV OPTICAL DISC" has already described the method composed of the steps of: firstly determining only the moving direction of the optical head; driving, in advance, the optical head moving medium; obtaining, thereafter, the present position (track number) corresponding to the present address and the target position (track number) corresponding to the access target address by the calculation; calculating the track number therebetween (between the present position and the target position); and finally performing the access control.

However, there is a limitation in the realization of the high-speed operation obtained in such way as mentioned heretofore. Therefore, sufficient high-speed access cannot always be realized.

On the other hand, the published specification of Japanese Laid-upon Patent Publication No. 8-279129 filed by SONY Co., Ltd. entitled, "A METHOD OF MANUFACTURING THE CLV DISC" does not describe technology relating to the method of providing the usual CLV format. Instead, it describes the technology relating to a method of arranging sectors without causing any angular positional error obtained at the time of ideally driving with CLV. The above specification has already described the method composed of the steps of: causing the formatter to receive the start position of the start sector's address from the cutting machine with the same angular information; previously estimating the address situated at the same neighboring angular position as that of the start address by the calculation; changing the buffer length when the sector arrives at the above-mentioned estimated address; confirming thereby the arrival of the electric signal of the angular information sent from the cutting machine; sending the address signal of the next sector and thereby absorbing the variation of the angular position due to the error of the cutting start radius position and due to the change of the track pitch; and making uniform the sector angle between the different stampers.

However, according to the method as mentioned above, it is inevitably necessary to provide special processing such as the estimation of the sector arriving at the same neighboring angular position as that of the start sector and the compensation of the buffer length, etc.

As mentioned above, the background-art CLV optical disc requires a lot of time for performing the calculative conversion between the logical information number and the physical position. Therefore, the speed of accessing the disc information is inevitably lowered. This is a problem to be solved.

To provide a large capacity optical disc medium, it may be profitable to adopt the CLV (Constant Linear Velocity; Line Speed-Constant) format in which the line density of the information becomes constant. However, in the CLV format, in the case of accessing a specified sector, it is required to perform the control operation such that the revolution rate of the spindle motor for rotating the disc is changed in accordance with the disc radius position on which the sector exists and the scanning line speed of the reproducing track is made constant.

On the other hand, while the CAV (Constant Angular Velocity; Angular Velocity-Constant) format is inferior in terms of storage capacity, it is superior as to case of accessing. Namely, the respective sectors are arranged on the radius line of the disc, and all of the sectors can be accessed using the same disc revolution rate at the time of reproducing.

Furthermore, there exists an MCAV format taking advantage of the large capacity of the CLV format and the high-speed accessing of the CAV format. In the MCAV format, plural zones are provided in the radius direction of the disc, one circle of the track is divided into plural pieces of the sector in each of the respective zones, and the number of the divided sectors is increased toward the outer circumferential zone of the disc, and then the distribution of the information amount in the radius direction of the disc is approximated (brought close) to the information distribution of the CLV format and the respective sectors are aligned in the radius direction per each of the respective zones. In such format, regarding the movement between the zones, although it is necessary to change the revolution rate of the disc or to change the frequency of the clock for recording/reproducing under the condition of making constant the revolution rate, the high-speed accessing of the CAV format can be obtained in the respective zones.

The method of accessing disc tracks of discs having these formats is discussed below. At first, as shown in FIG. 11A, regarding the CLV format, the revolution rate of the disc is controlled such that the line speed of scanning the track becomes equal to a predetermined value for the track on the radius position of the specified disc or for the track on the radius position where the pickup is situated now, by use of the period of a specified reproducing data signal or the wobble signal obtained from the zigzag movement of the constant period previously assembled (established) on the track at the time of making the master board.

At the step of controlling the disc revolution number, the address information is decoded and thereby the present address value can be obtained. Next, the seeking operation is started from the difference between the present address and the target address. In the CLV format, the arrangement of the respective addresses is different from each other for the respective discs generally due to the difference of the line speed settings at the time of making the master board or due to the slight (very small) line speed error, etc. in spite of intending to perform the same settings.

Consequently, the seeking operation is performed as follows: Assuming the designated place of the target address, when the pickup is moved it counts the number of the transverse tracks. At the time when the pickup arrives at the assumed track, the address value is acquired again and the difference between the acquired address value and the target address value, if any, is determined. When the former differs from the latter, the position of the target address is assumed again, and the abovementioned operation is repeated until the acquired address arrives at the target address. At this time, the disc revolution rate is always controlled corresponding to the reproducing address position.

Next, the CAV format is described. As shown in FIG. 11B, the revolution rate of the disc is set to a predetermined revolution rate. At this time, the address information of the optional track can be obtained. The address value is obtained, and then the seeking operation is performed from the difference between the obtained address and the target address. In the CAV format, since the arrangement of the respective sectors is definite, it turns out to be possible to arrive at the target address precisely and with high speed by just counting each transverse track number at the time of performing the seeking operation.

On this occasion, it is not necessary to control the revolution rate of the disc as in the case of the CLV format. However, even in this case, it is necessary to set the predetermined revolution rate and to acquire the address value when the present address value is obtained, as in the case of the CLV format.

In the MCAV format, as shown in FIG. 11C, the arrangement of the sector having the respective address is clearly defined. Therefore, the seeking operation to the target address can be precisely done with high speed as in the case of the CAV format. However, in the seeking operation of striding (stepping over) the zones, it turns out to be necessary to control the disc revolution rate of the disk or to control the frequency of the recording/reproducing clock. Even on this occasion, regarding the acquisition of the present address value which is the first operation of seeking, it turns out to be necessary to set the revolution rate to a predetermined revolution rate.

For instance, the published specification of Japanese Laid-open Patent Publication No. 6-231469 discloses the featured address ID data modulated with BPM (Bit Position Modulation) by way of the PE (Phase Encoding) as a background art and recorded on the recording medium. The art does not require any special sector mark and realizes the preferable sector synchronization, and enables to calculate the line speed information of the track from the interval between the detection pulses of the address part. The abovementioned operation itself is performed on the basis of the disc rotation control corresponding to the position in the radius direction of the disc and the reproduced address value. And then, since there scarcely exists the correlation between the address ID data and the data modulated and recorded with PWM (Pulse Width Modulation), the sector synchronization and the detection of the address ID can be preferably performed in synchronism with each other. In addition, the basis speed of the track can be presumed (assumed) on the lines of the pulse width given (created) by the phase encoding (PE), and thereby the high-speed accessing can be realized.

Furthermore, the specification of Japanese Patent No. 2,689,980 relates to the seeking control in the CLV disc format and discloses the method of the seeking control, in which the wobbling signal of the predetermined frequency is modulated with the address information coded by a frequency lower than the predetermined frequency and the address information is extracted from the wobbling track of the optical disc which is wobbled and thereby formed corresponding to the modulated signal, and in such way the seeking operation is controlled.

Furthermore, the published specification of Japanese Laid-open Patent publication No. 5-266497 discloses the method of the seeking control in the CLV disc format, in which the offset value for the short-distance access and the offset value for the long-distance access are previously programmed, the offset value is selectively used in accordance with the distance to the place to be accessed, and then the track jumping is performed. In such seeking method, the accessing operation can be intended to speed up.

Furthermore, according to the method of accessing the information of the CLV optical disc discloses in the published specification of Japanese Laid-open Patent publication No. 9-16980, the number of the tracks for moving is calculated from the difference between the present track number and the target track number, the track jumping or seeking operation is performed. However, in such background-art method, there arises a problem to be solved that the accessing operation may be delayed, because the calculation of the logical information number and the physical track position takes a long time, regarding the information accessing of the disc recorded by the CLV method. In the above-mentioned background art, only the moving direction of the optical head is firstly determined, the optical head conveying medium is driven in advance, the present position (track number) corresponding to the present address and the target position (track number) corresponding to the target position (track number) corresponding to the accessing target address are obtained by the calculation, and the number of the tracks therebetween is calculated and thereby the control of accessing can be performed.

With the development of the Laser technology, the optical disc medium has been widely used as the recording/reproducing medium and satisfied the demand of large memorizing capacity as DVD-ROM, DVD-RAM, and DVD-R, etc. In order to realize a large memorizing capacity, narrow pitch and small pit are always successively required for those optical disc media.

As to the large memorizing capacity, the CLV disc format capable of realizing the constant line density of the information recording may be profitable. However, in such CLV disc format, when the intended sector is accessed, it is necessary to control the scanning line speed of the reproducing track so as to make it constant by changing the revolution rate of the rotating motor corresponding to the radius direction of the optical disc medium in which the sector exists. As the result, the control of the optical disc medium may become further complicated.

On the other hand, the CAV disc format is profitable in that the respective sectors are arranged on the radius line of the optical disc medium, the accessing with the same revolution rate can be done for every sector at the time of reproducing, the revolution rate of the optical disc medium is set to the predetermined revolution rate, the address value of the optional track is taken in, the seeking operation is done on the basis of the difference between the address value thus taken in and the target address value, the number of tracks traversed is counted, and in such way the operation of accessing the target address can be done effectively.

However, in the above-mentioned CAV disc format, the memorizing capacity per one track is determined by the number of the recordable marks in the recording area of the optical disc medium, and therefore the problem of the large memorizing capacity has arisen.

Furthermore, an M-CAV (Modified CLV) disc format has been also used. The M-CAV takes in the large memorizing capacity of the CLV disc format and the high-speed accessing of the CAV disc format.

In such M-CAV disc format, plural zones are provided in the radius direction of the optical disc medium, the entire circumference of the track is divided into plural sectors in the respective zones, the number of the divided sectors is gradually increased toward the outside zone in the radius direction, and the recording distribution of the information amount in the radius direction of the optical disc medium is approximated to that of the CLV disc format.

Furthermore, in such M-CAV disc format, the respective sectors are arranged in the radius direction per each of the respective zones, the recording frequency is set so as to gradually increase it, and therefore the high-speed accessing of the CAV format can be obtained in the zone.

The background arts in connection with the CLV drive controlling method of the spindle motor and the slide motor and the CLV format in the optical disc cutting machine are described hereinafter.

The published specification of Japanese Laid-open Patent Publication No. 6-36272 relating to the rotation of the disc (corresponding to Japanese Published Patent Publication No. 6-36272) discloses the control operation, in which one time period of the rotation pulse obtained from the rotation pulse generator mounted on the spindle is counted with the constant value by the pulse train obtained from the radius signal generating unit for obtaining the radius signal having the value corresponding to the radius position where the optical pickup exists and the variable frequency generating unit capable of modulating the frequency so as to make constant the product of the radius signal and the frequency, the error of the calculated value is fed back to the speed, and thereby the line speed of the optical disc on the optical track.

The published specification of Japanese Laid-open Patent Publication No. 8-235769 relating to the method of controlling the motor revolution rate and the apparatus for practicing the above controlling method discloses the method of obtaining the revolutions rate variation further approximated to the revolution rate variation in the ideal CLV method by the following two methods:

(1) A motor rotation controlling method of controlling the motor rotation by stepwisely reducing the variation rate of changing the number of revolutions of the motor corresponding to the positional variation of the optical disc in the radius direction; and (2) A motor rotation controlling method of successively and alternately providing the first section (block) in which the motor rotation is controlled by stepwisely reducing the variation rate of changing the number of revolutions of the motor corresponding to the positional variation of the optical disc in the radius direction and the second section (block) in which the motor is rotated with a constant number of revolutions and controlling the rotation of the motor in such first and second sections as mentioned above.

The specification of Japanese Patent No. 2,844,565 relating to the CLV controlling apparatus discloses the method of controlling the revolution rate of the spindle on the basis of the target line speed data and the radius position data.

The published specification of Japanese Laid-open Patent Publication No. 8-279192 describes the method of manufacturing the CLV disc. The Laid-open Patent does not directly relate to the CLV controlling method. Instead, it relates to the arrangement of the sectors without any angular position error which can be obtained in the case of performing the ideal CLV drive at the time of cutting the CLV disc format.

The formatter receives the start position of the start sector address with the same angle information from the cutting machine. The address coming close to the same angle as that of the start address is previously estimated by the calculation. When the sector comes at the above address, the buffer length is changed, and then the arrival of the electric signal of the angle information sent (transmitted) from the cutting machine is confirmed, and then the address signal of the next sector is sent out. In such way, the error of the cutting start radium position and the variation of the angular position due to the track pitch variation can be absorbed. Thereby, the sector angles between the different stumpers can be aligned (made uniform).

Regarding the method of evaluating the CLV drive accuracy of the spindle motor or the slider in the optical disc master board exposing apparatus, the method of controlling the CLV drive, and the apparatus for practicing those methods, it is noticed that the phase difference of the pulse train having the constant period length between the adjacent tracks due to the fundamental clock linearly changes.

SUMMARY OF THE INVENTION

Heretofore, the background arts regarding the CAV optical disc and the CLV optical disc and the CAV and CLV type methods of disc formatting etc. have been described. However, according to such background arts which are disclosed in background-art documents, e.g., Japanese Laid-open Patent Publication Nos. 9-16980 and 8-279192, there exists no advantageous functional effect for improving the CLV optical disc and the CLV type method of disc formatting. The present invention has been made in view of the above-mentioned problems and other problems in order to solve the unfavorable problems.

To state in more detail, the present invention solves the background-art defects such as the above-mentioned problems. The present invention provides an improved CLV optical disc and the CLV type method of disc formatting. The present invention solves the problems of the background art that the calculative conversion of the logical information number and the physical position from each other require a lot of time to perform and adversely affect the speed of accessing the disc information.

In consideration of such problems (defects) of the background art, the present invention enables to realize the CLV optical disc capable of facilitating the calculative conversion of the information number and the track number from each other, eliminating the unevenness of the format of the disc manufactured by use of the different optical disc master board (plate), and accessing the disc information with high speed. Other objects, features and advantages of the present invention will become apparent from the following detailed description when read in conjunction with the accompanying drawings.

In the background arts, the first part of the seeking operation is performed on the basis of the control of the disc rotation corresponding to the position in the radius direction of the disc and the reproduction of the address information previously recorded as the wobbling track. However, the respective information amounts on the optical disc differ from each other. As the result, the conversion from the information number and the number of tracks, and vice versa, may become difficult. In accordance with the tendency to increase memory capacity, the track pitch is narrowed and the information pit is small-sized. Consequently, the conversion between the information number and the tracks number may become further difficult.

The present invention was made in order to solve such problems. The invention realizes the complete disc format and provides the CLV disc format capable of accessing the optional address with high speed.

As to the optical disc medium recording and reproducing apparatus, the CLV (disc format) is profitable for the optical disc medium. The primary condition required in the multiple-media era is the large memorizing capacity with the high recording density capable of recording and reproducing the image of high quality and the audio signal of high sound quality. Regarding this point, the CLV and the M-CLV satisfy the demand. Forming the sector of constant length, the data can be recorded in synchronism with the constant clock. The condition of recording and reproducing the laser power, etc. on every position of the optical disc medium.

In such CLV disc format, the revolution rate of the optical disc medium is controlled corresponding to the position in the radius direction so as to make the track scanning line speed equal to the predetermined value by the period of the specified reproducing data signal or the wobble signal of a constant signal previously assembled in the track at the time of making the master board, for the track on the predetermined radius direction of the optical disc medium or the track on the radius direction where the pickup is located. In such state, the seeking operation is performed.

Generally, in the CLV disc format, since the arrangement of the respective sector slightly differs from each other per each of the respective master boards due to the setting error at the time of setting the line speed when the master board is made, the target address is set at the time of the seeking operation, and counting the number of tracks traversed as the pickup is moved. When the pickup arrives at the setting track, the address value is taken out again. Such taking-out of the address value is repeated until the address value arrives at the target address value. In such way, in the CLV disc format, it is necessary to perform the seeking operation after controlling the revolution rate of the optical disc, and the seeking operation cannot be performed with high speed. Those are the background-art problems to be solved.

The present invention was made in consideration of the present state of the seeking operation performed by the optical disc medium recording/reproducing apparatus. The invention aims at providing the CLV optical disc medium recording/reproducing apparatus capable of performing the seeking operation independently from the operation of controlling the revolution rate of the disc.

In the recent years, DVD-ROM, DVD-R, and DVD-RAM, etc. have become popular. In the DVD standard specification, it has been required that the fine-structure preformat of almost half size should be formed on the optical disc master board, compared with the first case of track pitch: 0.7 $\mu$m and the minimum pit length: 0.44 $\mu$m and the second case of the present standard specification of track pitch: 1.6 $\mu$m and the minimum pit length: 0.87 $\mu$m. In accordance with the demand of increasing storage or memory capacity, further narrowed track pitch and even smaller sized pits are inevitably required. And, in addition, it is further required to provide the optical disc cutting machine of high accuracy and high quality.

Under the aforementioned circumstance, when the disc of the CLV format is cut, the CLV drive control with further high accuracy is required in the optical disc cutting machine. Further, the line speed of cutting the disc is required to be constant regardless of the radius cutting position. Therefore, the revolution rate of the spindle and the moving speed of the slider have to be controlled such that both of them continuously (successively) reduce in inverse proportion to the radius position variation.

The period of the pulse train obtained by the rotation pulse generator mounted on the spindle by use of the pulse train obtained from the variable frequency generator in which the output frequency is changed in inverse proportion to the radius position. Thereby, the CLV drive control can be realized. In such method, the standardized pulse train for the CLV drive can be created by the medium (potentiometer) for detecting the radius position and the variable frequency generating medium. The detection error of the radius position and the setting error of generated frequency are included therein. In such way as mentioned above, even though the accuracy required in the background-art CLV drive control can be attained, those errors cannot be ignored and have to be removed in order to realize the further high-accuracy CLV drive control.

Furthermore, the general rotation pulse generator is constructed such that the circular disc board having slits radially formed thereon is mounted on the spindle shaft, the light source and the light detector are arranged so as to put the slit therebetween, and the rotation pulse can be obtained by directing the light as the incident light accompanying the rotation of the spindle and intercepting the same light. At this time, even though the slits are precisely and radially arranged so as to divide them at an equal interval, it is observed that the seeking speed variation is included in the rotation pulse train due to the mounting eccentricity of the slit circular disc board onto the spindle shaft. In case that the rotation pulse train is employed as it is for the feedback of the rotation drive, the efficiency of the control is lowered contrary to the expectation. Even in the optical disc cutting machine, the CLV drive control is performed with the almost similar construction. In order to improve the CLV drive accuracy, the reading-out accuracy is firstly intended to improve, and then the pitch accuracy is mainly intended to also improve.

In the background art, the revolution rate is changed with a constant changing rate for the position in the radius direction, or otherwise, the relationship between the radius position and the revolution rate is approximated further close to the ideal relationship therebetween by alternately providing a section in which the revolution rate changes with a constant changing rate and another section in which the revolution rate is constant, in order to make the actual revolution rate fall within the predetermined error area (range) for the ideal revolution rate change of the spindle corresponding to the position in the radius direction. Even in such method, as to the revolution rate of the CLV drive, a revolution number pattern, etc. of a certain designated constant is generated and changed over from those values on the radius position as the standard. In order to further raise the CLV revolution (rate) accuracy, it is necessary to intend to raise the accuracy of the linear scale for detecting the radius position and also intend to raise the number of the multiple changing-over points.

In the other background art, although the art does not relate to the direct CLV drive control, if the ideal CLV drive is always performed, the positional relationship of the respective sectors on the CLV disc which is cut by the cutting machine can be always equal. The art aims at realizing such arrangement. Here, previously assuming (estimating) the sector coming to the position near the same angle as that of the start sector, when the sector arrives at the position, the deviation from the estimated value is compensated (corrected) by changing the buffer length. In such way, the positional relationship between the respective sectors is made almost equal and thereby the cutting can be enabled. However, it is necessary to provide the special processes such as the estimation of the sector coming to the position of the same angle as that of the start sector and the compensation of the buffer length.

FIG. 21 illustrates a fundamental structure of the background-art optical disc cutting machine. The reference numeral 201 represents an exposing laser for exposing a glass master board 205 having a photoresist painted thereon (applied thereto). The reference numeral 202 represents an optical system for shaping the waveform of the exposing laser light emitted from the exposing laser and guiding the exposing light to a focus actuator 204. In such optical system, the focus actuator 204 insures that the exposing laser light directed as the incident light is focused in the state of a microspot. The focusing control is performed so as to keep the beam waist position to the photoresist position. The optical system, etc. for performing the focus control is omitted here. An optical modulator 203 turns on and off the exposing laser light on the basis of the signal Fout transmitted from the formatter 215 for causing to generate the signal for forming the pre-embospit or the groove on the glass master board 205. The reference numeral 216 represents a fundamental clock generator for generating the fundamental clock in order to drive the formatter 215. The glass master board 205 is absorbed (attracted) to the spindle motor 206 and rotated thereby. At the same time, the focus actuator 204 is moved in the radius direction by the action of the air slider 208. An encoder represented by the reference numeral 207 is mounted on the spindle motor and outputs a pulse train in accordance with the rotation. The reference numeral 214 represents a linear scale for detecting the radius position of the exposure spot. The reference numerals 209 and 211 represent drivers for respectively driving the slider and the spindle. The reference numerals 210 and 212 represent control circuits for respectively causing the slider and the spindle to follow thereto smoothly and with high accuracy for the movement order and the rotation order both indicated by a drive-system controller 213. The sensor for detecting the absolute position in order to preset the value of the linear scale is omitted here. Furthermore, although the two-beam exposure, and the zigzag movement of the exposure beam, etc. of the optical disc cutting machine are required to be set corresponding to the various sorts of disc format, the various sorts of the exposure optical system, etc. required therefor is omitted here because it does not directly relate to the present invention. By use of the aforementioned structure, the CLV drive is performed as follows:

At first, the drive-system controller 213 reads out the radius position ($\gamma$) of the present exposure spot from the linear scale 214. Next, the rotation ordering pulse of the spindle motor 206 is generated by use of a spindle drive ordering pulse creating circuit 217 so as to satisfy the following equation:

$$V1=\gamma \cdot \omega =(constant),$$

In accordance with the designation of the exposure line speed (V1), and then the revolution rate of the spindle motor 206 is controlled to the value w.

As to the CLV drive of the slider, in the similar way, the slider drive ordering pulse is generated from the value r by use of a slider drive ordering pulse creating circuit 218 so as to satisfy the following equation:

$$V1=V_s \times r \times 2 \times \pi /P=(constant).$$

Here, P is the spiral pitch. In such way, the moving speed is controlled to be Vs. Or otherwise, there exists another way of performing the control of moving the slider only by the spiral pitch during one revolution of the spindle.

In such a CLV drive method, the error or the variation of the radius position information of the exposing spot directly exerts an influence upon the rotation control of the spindle. Consequently, the arrangement of the respective sectors of the CLV format cannot be precisely controlled.

In order to solve the problems mentioned above, the present invention provides a method of creating an ideal CLV drive ordering pulse creating method for the spindle and the linear motor in the optical disc master board exposing apparatus.

The present invention provides a further local CLV drive ordering pulse creating method with small deviation and high accuracy. The invention further provides the CLV disc format enabling to create the high-accuracy CLV drive ordering pulse approximated further close to the ideal, without producing the accumulated error accompanying the operational calculation error per each of the respective tracks. The present invention further provides the CLV disc format enabling to create the high accuracy CLV drive ordering pulse with small local deviation in the track and with high accuracy further close to the ideal.

The present invention further provides the CLV disc format capable of creating the pulse train without any error for the railroad track length increase "π×P" of the one track after starting the CLV drive.

The present invention further provides the CLV disc format capable of creating the pulse train without any error for the railroad track length increase "$\theta_c^2/(4\times\pi)$" of the one segment after starting the CLV drive.

The present invention further provides the CLV disc format capable of creating the pulse train without any error for the fundamental railroad track length "$2\times\pi\times R_0$" at the time of starting the CLV drive.

The present invention further provides the CLV disc format capable of creating the pulse train without any error for the fundamental railroad track length "$\theta_{c\times R0}$" at the time of starting the CLV drive.

The present invention provides a method of controlling the CLV disc format exposure drive without any accumulative error for the ideal CLV drive. The present invention further provides the method of controlling the CLV disc format exposure drive such that the absolute position on the disc per access unit of the respective sectors formed on the CLV format disc or the relative positional relationship between the access unit (the positional relationship of the track and the angular relationship in the circular circumferential direction) is made equal to the arrangement on the ideal CLV disc format, and the access operation can be enabled, in which the ideal CLV disc format is assumed in the movement of the pickup to the address unit designated by the drive apparatus.

As is further apparent from the foregoing description, according to the present invention, the advantageous functional effects can be further realized as mentioned below.

In an aspect of the present invention, the drive of the spindle motor and that of the slider are controlled by use of the spindle rotation ordering pulse train and the slider movement ordering pulse train respectively created by frequency-dividing the fundamental clock pulse train, the respective frequencies of which are proportional to the ideal railroad track length which can be determined by the starting radius position of the spiral, the number of the tracks, and the spiral track pitch, per one revolution of the spindle.

In such structure, since the drive ordering pulse is created in synchronism with the fundamental clock of the CLV format per each one revolution of the spindle, it is possible to obtain the drive ordering pulse train having a very small accumulative error due to the ideal drive ordering pulse variation.

Furthermore, in the CLV drive control according to the present invention, only the data of the drive starting position and the radius position data are required. The other subsequent radius position data is not required. Consequently, a linear scale of high precision for detecting the radius position is not required. As a result, the cost of the entire apparatus can be reduced.

In another aspect of the present invention, the drive of the spindle motor and that of the slider are respectively controlled by the spindle rotation ordering pulse train and the slider movement ordering pulse train generated by frequency-dividing the fundamental clock pulse train in proportion to the number of the ideal railroad track length determined by an equal rotation angle or an optional rotation angle $\theta_c$ in a segment identified with a line segment on the spiral track divided by the equal rotation angle or the optional rotation angle $\theta_c$, per one revolution of the spindle, the start radius position of the spiral, the number of the spiral segments, and the track pitch of the spiral, per each one revolution of the spindle.

In such structure, since the drive ordering pulse can be created in synchronism with the fundamental clock of the CLV format per each segment, it is possible to obtain the drive ordering pulse train with a very small accumulative error due to the ideal drive ordering pulse variation and having very small local error.

In still another aspect of the present invention, when Ro is the CLV format start radius and P is the spiral track pitch the physical fundamental length is established such that the railroad track length $2\times\pi\times Ro+\pi\times P$ at a first track during one revolution of the spindle is an integral multiple of the fundamental clock or finite figure times being realizable at time of the operation calculation.

At a second track and all subsequent tracks, the physical fundamental length is established such that the increasing railroad track length $2\times\pi\times P$ during one revolution of the spindle is an integral multiple of the fundamental clock or finite figure times being realizable at the time of the operational calculation.

Furthermore, in still another of the present invention, when Ro is the CLV format start radius and P is the spiral track pitch, the physical fundamental length is established such that the railroad track length $\theta_c Ro+P\times\theta_c^2/(4\times\pi)$ at a first spiral segment during one revolution of the spindle is an integral of the spiral segment identified with the line segment on the spiral railroad track created by dividing the one revolution of the spindle by an equal rotational angle or an optional rotation angle $\theta_c$.

In such structure, it is possible to obtain the drive ordering pulse train having almost no accumulative error due to the ideal drive ordering pulse variation.

In still another aspect of the present invention, the recording medium of the CLV disc format obtained by use of the exposing drive control of the CLV disc format can perform the accessing operation utilizing the positional relationship, because of the coincidence of the arrangement on the disc in the circular circumference per each of the respective accessing units and the number of the tracks with the ideal CLV disc format.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 23 is a table (TABLE 1) for explaining the relationship between the track No.(M, M+1, M+2, M+3, M +4, . . . ) and the Lcb number per one track (integer part) and the remaining difference of the track (decimal fraction part);

FIG. 24 is a table (TABLE 2) for explaining the relationship between the track No.(S, S+1, S+2, S+3, S+4, . . . ) and the Lcb number per one track (integer part) and the remaining difference of the track (decimal fraction part); and FIG. 25 is a table (TABLE 3) for explaining the relationship between the state of the CLV drive and the exposure radius position, the spindle drive ordering pulse, and the slider drive ordering pulse.

DETAILED DESCRIPTION OF THE PREFERRED EMBODIMENTS

Figure 1:
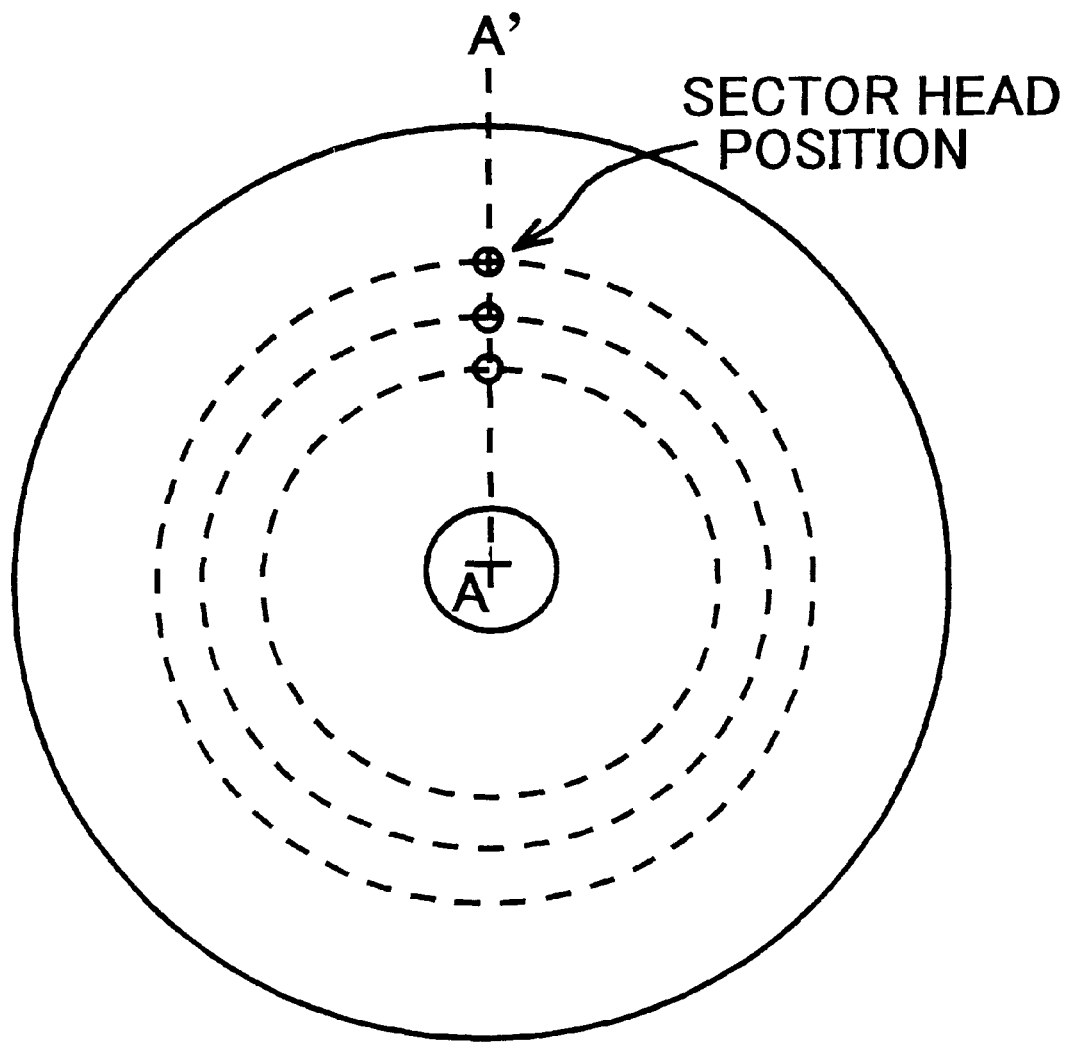
FIG. 1 is an explanatory diagram illustrating a format of a CLV (Constant Linear Velocity) optical disc according to the present invention.

In describing the preferred embodiments of the present invention illustrated in the drawings, specific terminology is employed for the sake of clarity. However, the invention is not intended to be limited to the specific terminology so selected and it is to be understood that each specific element includes all technical equivalents which operate in a similar manner.

Figure 2:
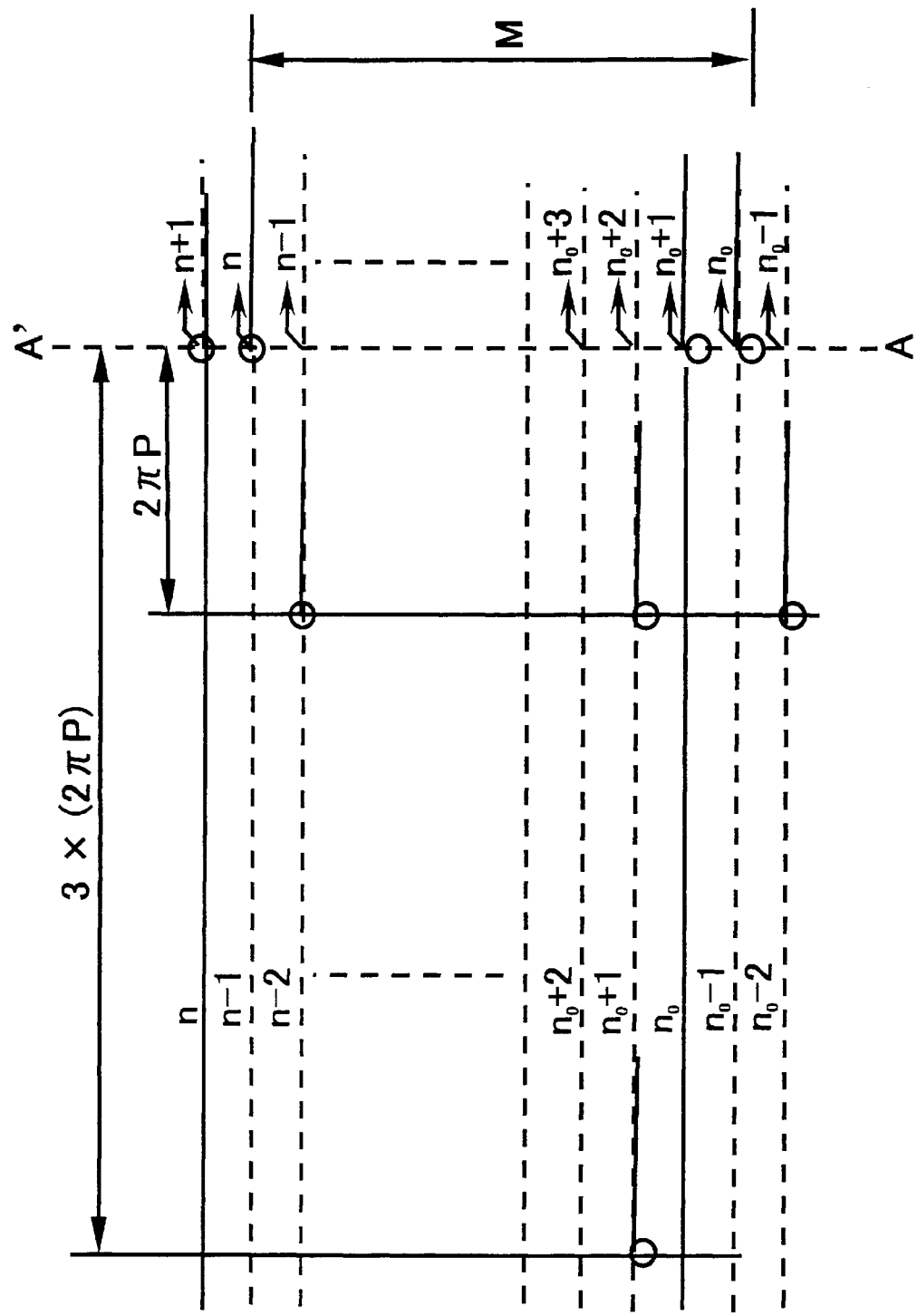
FIG. 2 is an explanatory diagram illustrating a sector arrangement of the CLV optical disc according to the present invention.
Figure 3:
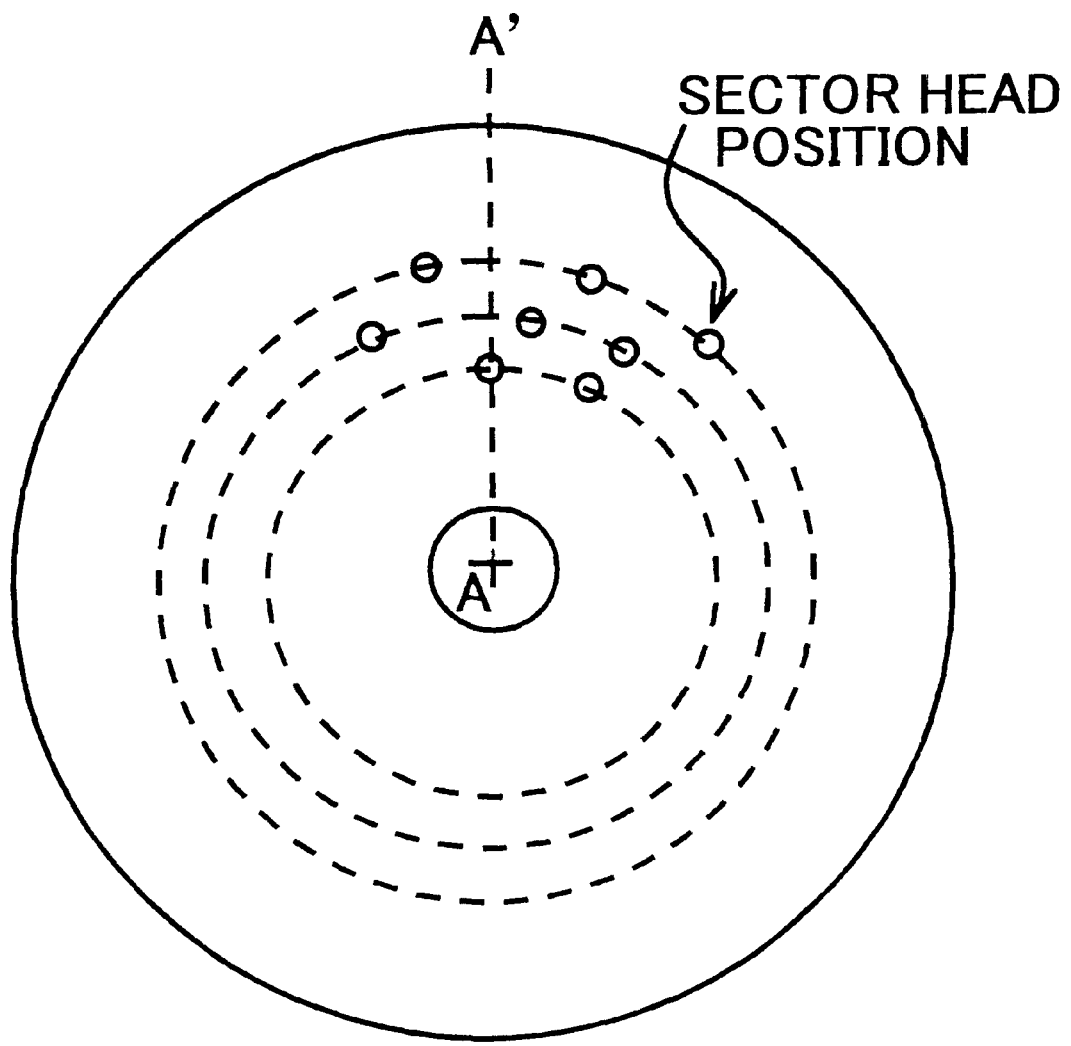
FIG. 3 is an explanatory diagram illustrating a format of a background-art CLV optical disc.

Referring now to the drawings, wherein like reference numerals designate identical or corresponding parts throughout the several views (diagrams), and more particularly to FIGS. 1 and 2 thereof, there are illustrated a format of a CLV (Constant Linear Velocity) optical disc according to the present invention and a sector arrangement of the CLV optical disc of the invention.

In the present invention, the CLV optical disc is recorded with information with a constant linear velocity, plural turn of a specified spiral track exist in a predetermined data area, railroad length of the tracks is an integral multiple of the length of a sector, the length of a sector on the specified tracks is $2 \times \pi \times N$ times a track pitch, the number N being a positive integer, and head positions of said specified tracks are lined up on a predetermined radius line at equal track intervals.

The invention further features the CLV optical disc of the first aspect, in which the tracks including a head sector on the predetermined data area are the specified tracks.

In order to solve the aforementioned various problems, the present invention is featured in that, in the CLV disc format constructed with a series of sectors having the sector length of the $2 \times \pi \times$(track pitch) length, track marks of fixed length are provided so as to be arranged at an equal (uniform) physical length interval along the information track in the information track formed in a spiral state for performing the recording/reproducing operation, and the track position information is provided by detecting track mark of the present track and the track mark of the adjacent track.

Consequently, the track position information such as the information of detecting the present track position and the track mark during the middle of the seeking operation and the positional information of the adjacent track can be obtained by the operations of detecting the track mark of the present track by use of the reproducing beam spot and the track jumping to the adjacent track, in the state of controlling the disc revolution rate to the line speed at the target track position, or in the state of not always coinciding with the line speed at the present track position.

Furthermore, as another aspect of the invention, the CLV disc format is provided with a series of the sectors having a sector length which is an integral multiple of the length of $\{2 \times \pi \times$(track pitch)$\}$ and with a track mark of fixed length arranged on a land portion of the groove track at an equal (uniform) physical length interval is provided along the groove track formed in the spiral state for performing the operation of recording or reproducing, the track mark of the present track and the track mark of the adjacent track are detected, and thereby the track position information can be obtained.

Consequently, the track position information such as the information of detecting the present track position and the track position information on the half way of the seeking operation can be obtained by the operations of detecting the track mark in the tracking state of the present track by use of the reproducing beam spot and detecting the track mark on the adjacent track, in the state of controlling the disc revolution number to the line speed at the target track position, or in the state of not always coinciding with the line speed at the present track position.

Furthermore, by obtaining the present positional information of the track from the present radius position information of the track and the other information of the distance between the track marks on the adjacent tracks, the track position information can be obtained from the rough track position information and the information of the distance between the track marks, and thereby the high-speed seeking operation can be realized.

Furthermore, since the track mark length is equal to n-times or one n-th (n; a positive integer) of the length of {2×π×(track pitch)}, when the distance between the track marks on the adjacent tracks in the CLV disc format, the measurement can be done simply and with high accuracy.

Furthermore, since the distance between the arranged track marks is equal to the logical track length, when the seeking operation is performed to the logical track formed by some pieces of the sectors, the track position information specified from the distance between the track marks on adjacent tracks and the logical track position information obtained by the track marks can be obtained so as to be jointly used. Moreover, by making the distance between the arranged track marks equal to the sector length, when the seeking operation is performed to a specified sector, the track position information specified by the distance between the track mark interval on the adjacent track and the sector position information obtained by the track mark attached to the respective sectors can be obtained so as to be jointly used.

Furthermore, since the distance between the arranged track marks is equal to one n-th (n; a positive integer) of the sector length, when the seeking operation is performed onto a specified track position, the completion of measuring the distance between the track marks on the adjacent tracks can be realized in a short time. Thereby, the seeking operation can be performed with high speed. Moreover, by additionally forming on the track mark the codes for specifying the zones divided into plural areas for changing the distance between the same adjacent track marks in the radius direction of the disc, it turns out to be not necessary to prepare the medium for specifying the present approximated track position.

Moreover, in order to attain some of the aforementioned objects of the present invention, the track marks are arranged at a predetermined interval on the spiral track formed on the optical disc medium. The pickup is moved in the radius direction of the optical disc medium. The present invention relates to an optical disc medium recording/reproducing apparatus for recording and reproducing the information onto the optical disc medium by use of the pickup in the CLV mode rotation state of the rotation motor of the optical medium. The optical disc medium recording/reproducing apparatus of the invention including a track marks distance calculating medium for calculating the distance between the track marks on the adjacent tracks on the basis of the detection information of the track mark detected by the pickup, a position detecting medium for detecting the position on the optical disc medium of the pickup in the radius direction thereof, and a movement controlling medium for practicing, regardless of the setting of the CLV mode by use of the rotation motor, the movement control to the target address position for the pickup, on the basis of the distance data between the track marks calculated by the track marks distance calculating medium and the position data detected by the position detecting medium.

Moreover, in order to attain some others of the aforementioned objects of the present invention, the track marks are arranged at a predetermined interval on the spiral track formed on the optical disc medium. The pickup is moved in the radius direction of the optical disc medium. The present invention relates to an optical disc medium recording/reproducing apparatus for recording and reproducing the information onto the optical disc medium by use of the pickup in the CLV mode rotation state of the rotation motor of the optical medium. The optical disc medium recording/reproducing apparatus of the invention including a track marks distance calculating medium for calculating the distance between the track marks on the adjacent tracks on the basis of the detection information of the track mark detected by the pickup, a position detecting medium for detecting the position on the optical disc medium of the pickup in the radius direction thereof, a position calculating medium for calculating the position of the pickup on the optical disc medium in the radius direction thereof, and a movement controlling medium for practicing, regardless of the setting of the CLV mode by use of the rotation motor, the movement control to the target address position for the pickup, on the basis of the distance data between the track marks calculated by the track marks distance calculating medium and the position data calculated by the position calculating medium.

The first through twenty-second embodiments are concretely described, in detail, hereinafter.

First Embodiment

The first embodiment of the CLV optical disc according to the present invention is described concretely in detail hereinafter, referring to the accompanying drawings.

In a spiral track of equal pitch formed by the CLV driving, the railroad track length L of the entire track thereof is expressed by below equation (1).

$$L = \pi \times (r^2 - Ro^2)/P \tag{1}$$

$$r = Ro + n \times p (n=1,2,3,\ldots) \tag{2}$$

Figure 4:
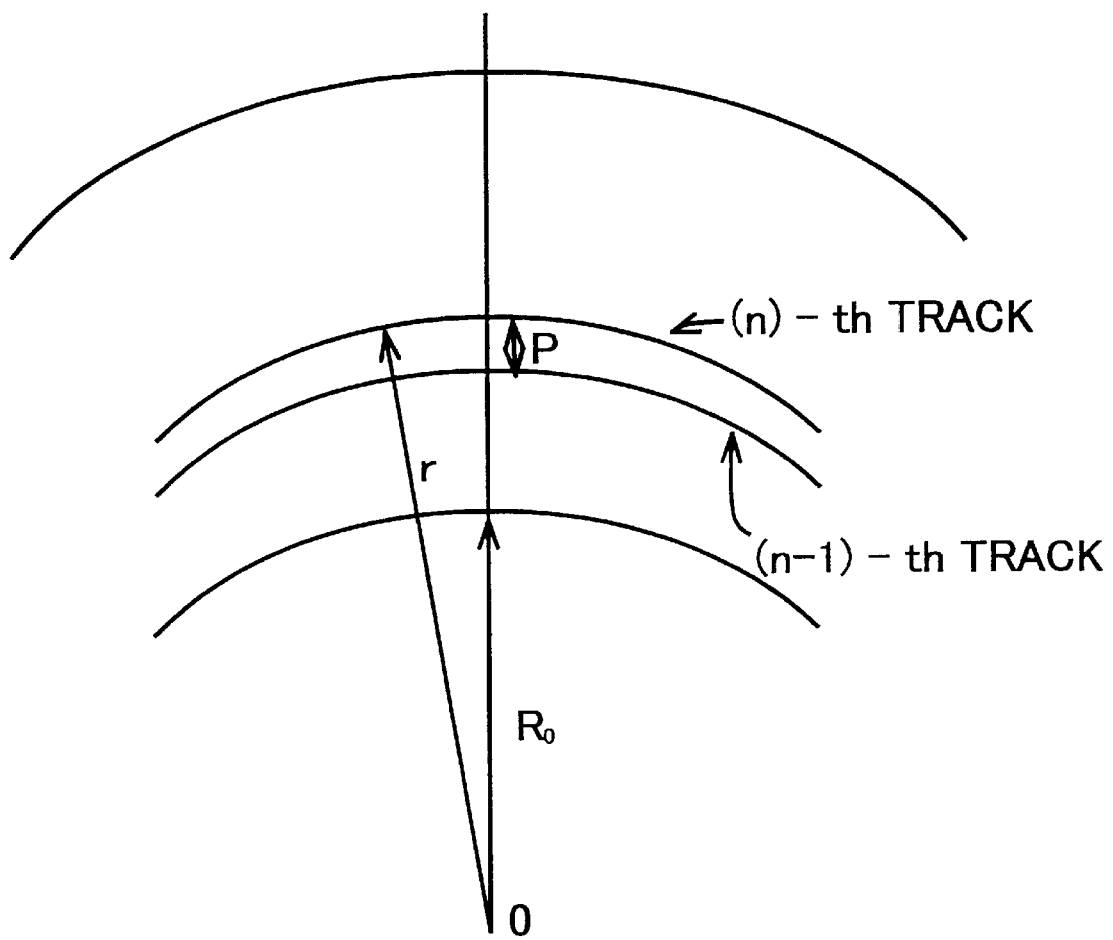
FIG. 4 is an explanatory diagram illustrating the meaning of constant.
Figure 5:
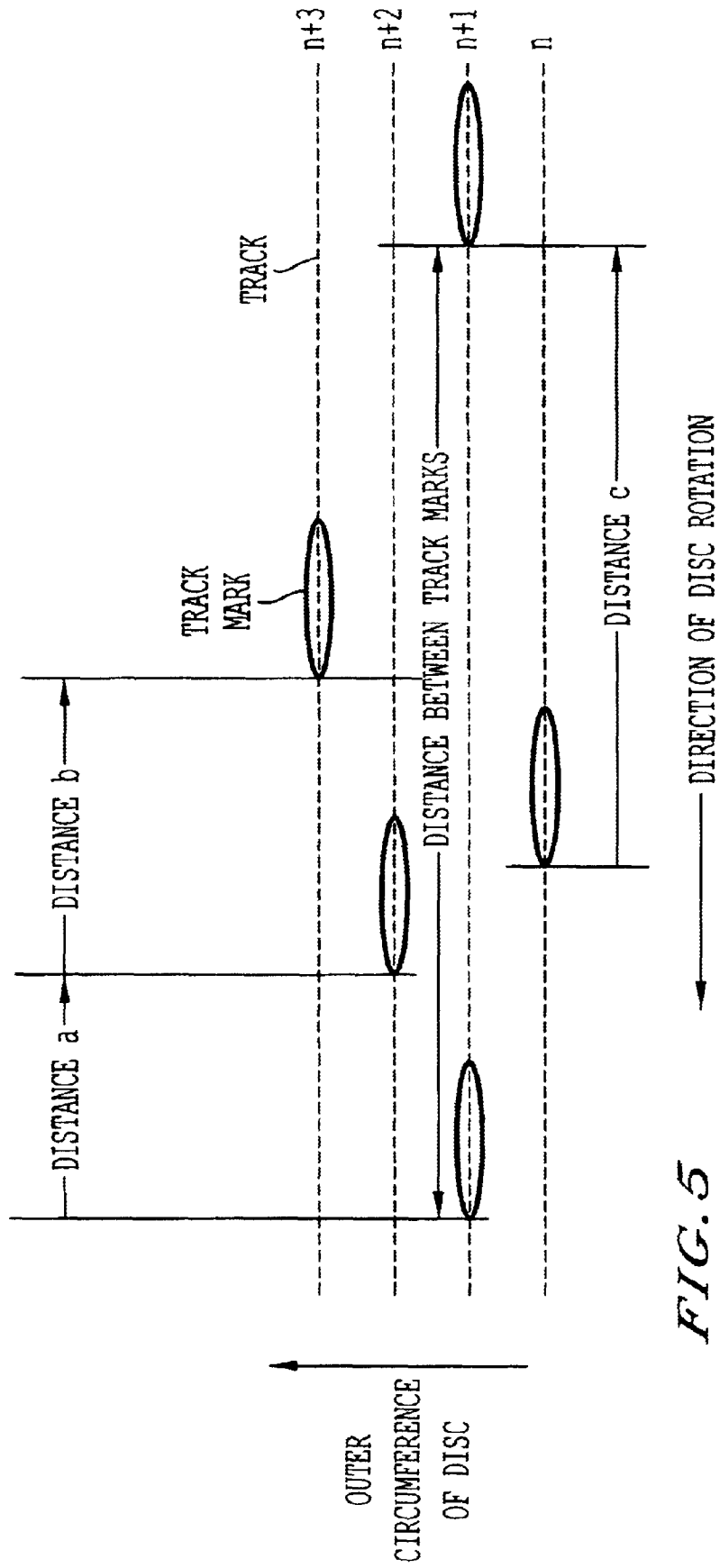
FIG. 5 is a property diagram illustrating the variation of the distance between the adjacent track marks in the third embodiment according to the present invention.
Figure 6:
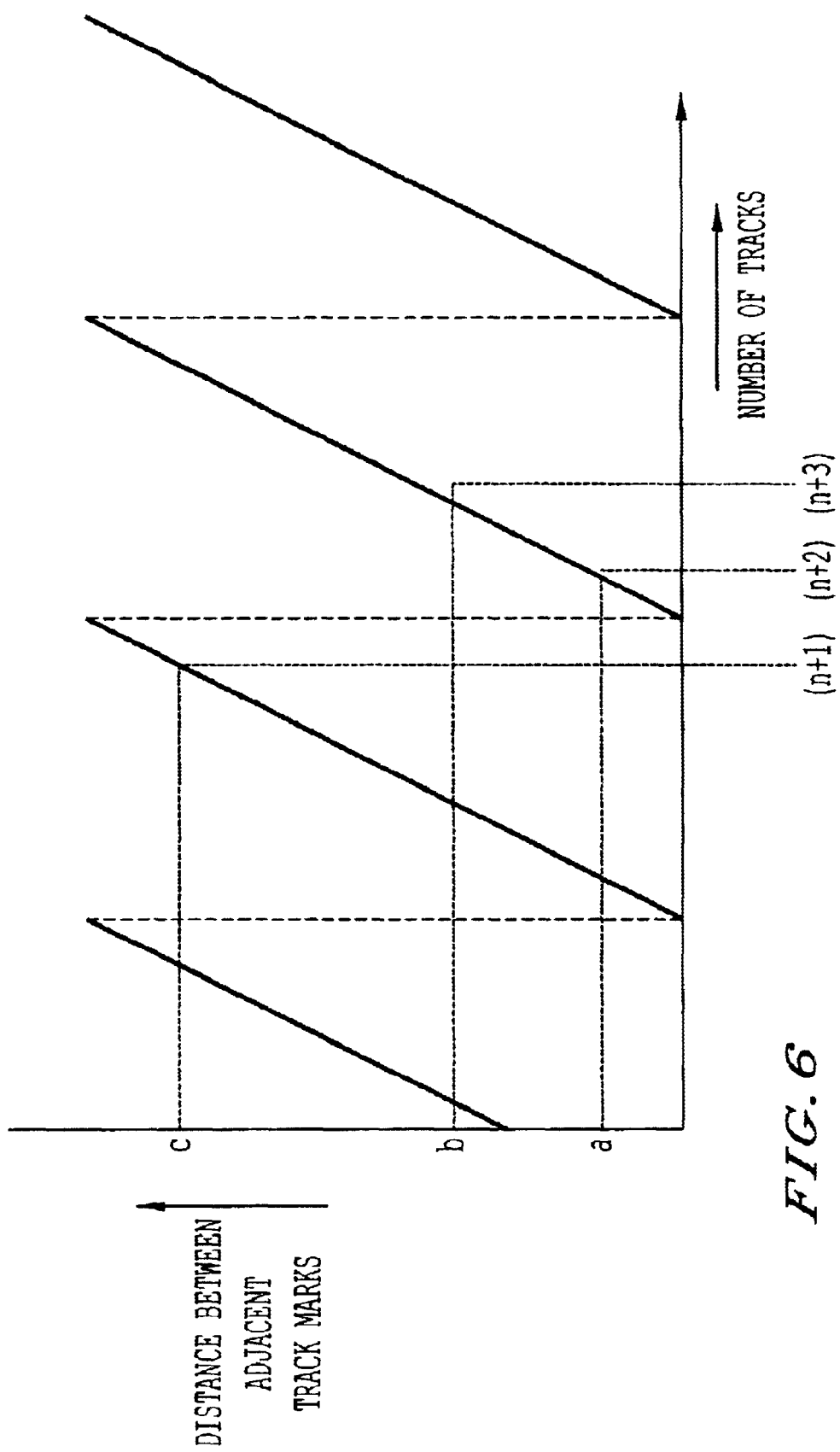
FIG. 6 is a property diagram illustrating the variation of the distance between the track marks and that of the distance between the adjacent track marks in the third embodiment.

Here, as shown in FIG. 4, the symbol Ro represents the radius position of starting the spiral, r represents the radius position of the spiral for measuring the railroad track length L, P represents the spiral track pitch, and n represents the number of the tracks.

An equation (3) shown below can be obtained from the above equations (1) and (2):

$$L = 2 \times \pi \times Ro \times n + n^2 \times P (n=1,2,3 \ldots) \tag{3}$$

$$Ln = 2 \times \pi \times Ro + (2 \times n - 1) \times \pi \times P (n=1,2,3,\ldots) \tag{4}$$

From the equation (4), it is apparent that the railroad track length difference between the adjacent tracks is constant as shown below:

$$[\text{Railroad Track Length Difference between the Adjacent Tracks}] = 2 \times \pi \times P = \text{constant} \tag{5}$$

Here, assuming that a sector head position on a track is taken as a standard position, and an increasing railroad track length (sumdLm) is obtained at the position preceding by m tracks, the relationship between the increasing railroad track length and the other constants is expressed by the following equation (6):

$$\text{sumd}Lm = 2 \times \pi \times P(1+2+3+\ldots+m) = \pi \times P \times m(m+1) \tag{6}$$

Next, the outline of the CLV optical disc format relating to the first-aspect embodiment of the present invention illustrated in FIG. 1 is described hereinafter.

Assuming that the head positions of the sector are arranged at equal track intervals on a radius line A–A', sectors of integer number No are contained on the information area or the inner circumferential track no thereof and the sector length is integer (Ns) times $2 \times \pi \times P$, the relationship between Lno, Ro, no, P, Ns, No, and the sector length can be expressed by the following equations (7) and (8):

$$Lno = 2 \times \pi \times Ro + (2 \times no - 1) \times \pi \times P = 2 \times \pi \times P \times Ns \times No \quad (7)$$

$$2 \times \pi \times P \times Ns = [\text{Sector Length}] \quad (8)$$

Here, both of Ns and No are integers. Assuming that, in the track (n−1), since the railroad track length difference from the track no to the track (n−1) is an integral multiple of the sector length, the relationship between the constants can be expressed by the following equation (9) obtained from equation (6):

$$(n-1-no) \times (n-no) = 2 \times Ns \times Nx \quad (9),$$

wherein both of Ns and Nx are integers, and furthermore, in the track n, the relationship therebetween can be expressed by the following equation (10):

$$Ln = 2 \times \pi \times Ro + (2 \times n - 1) \times \pi \times P = 2 \times \pi \times P \times Ns \times No' \quad (10),$$

wherein both of Ns and No' are integers, the head positions of the sector are arranged on the same radius line A–A' as shown in FIG. 2.

The above relationship is proved hereinafter, by the following descriptions and equations. From the equation (7), the following equation can be obtained:

$$2 \times \pi \times Ro = 2 \times \pi \times P \times Ns \times No - 2 \times \pi \times P \times no + \pi \times P \quad (11)$$

Substituting the equation (11) for the equation (10), the following equation (12) can be obtained:

$$n - no = Ns \times (No' - No) \quad (12)$$

Here, assuming that n−no is an integer M (n−no=M), it may be allowable that there exist the integers; M, Nx, No', and No satisfying the following two equations (13) and (14):

$$M \times (M-1) = 2 \times Ns \times Nx \quad (13)$$

$$M = Ns \times (No' - No) \quad (14)$$

In the equation (13), the situation is considered to be divided into two cases; those are, that Ns is an odd number and that Ns is an even number.

When Ns is an odd number, assuming that M is equal to Ns, namely, $$M = Ns \quad (15),$$

the following equation (16) can be obtained by substituting the above equation (15) for the former equation (13):

$$Ns \times (Ns-1) = N \times (2 \times Nx) \quad (16),$$

and the number Nx satisfying the equation (13) can be expressed by the following equation (17) from the above equation (16):

$$Nx = (Ns-1)/2 = (\text{Odd Number})/2 = \text{Integral Number (Integer)} \quad (17)$$

Thereby, the number Nx exists. Furthermore, at this time, the number Nx also satisfies the equation (14), and thereby the following relationship (equation) can be obtained:

$$(No' - No) = 1$$

Consequently, when Ns is the odd number, namely, sector length is odd-number times of $2 \times \pi \times P$, the number Nx is arranged (lined up), at least, per M=Ns tracks. Furthermore, the number of the sectors contained in the track is incremented by "1" successively.

On the other hand, when Ns is the even number, assuming that M is equal to 2×Ns, namely, $$M = 2 \times Ns \quad (18),$$

the following equation (19) can be obtained by substituting the above equation (18) for the former equation (13):

$$2 \times Ns \times (2 \times Ns - 1) = 2 \times Ns \times Nx \quad (19),$$

and the number Nx can be expressed by the following equation (20) from the above equation (19):

$$Nx = 2 \times Ns - 1 = \text{Integral Number (Integer)} \quad (20)$$

Thereby, the number Nx exists. Furthermore, at this time, the number Nx also satisfies the equation (14), and thereby the following relationship (equation) can be obtained:

$$(No' - No) = 2$$

Consequently, when Ns is the even number, namely, the sector length is even-number times of $2 \times \pi \times P$, the number Nx is arranged (lined up), at least, per M=2×Ns tracks. Furthermore, the number of the sectors contained in the track is incremented by "2" successively. In such way, the format of the CLV optical disc of the first-aspect embodiment can be realized.

Secnod Embodiment

Next, the outline of the CLV optical disc format relating to the second embodiment of the present invention is described hereinafter.

In the second embodiment, the format of the CLV optical disc includes the track having a head sector as the designated sector. As to such track, the radius positions (Ro, no) of the track including the head sector as mentioned above, or the sector lengths thereof (P, Ns) is designed so as to satisfy the above-mentioned equations (7) and (8). In such way, the format of the CLV optical disc of the second embodiment can be realized.

Summarized Description of the First and Second Embodiments

As is apparent from the foregoing description, the present invention can demonstrate the advantageous superior functional effects as mentioned hereinafter.

To state in more detail, in the CLV optical disc capable of recording the information utilizing the CLV (Constant Linear Velocity) method according to the first embodiment, there exist plural lines of the specified track having the railroad line track length which is integer times of the sector length in the predetermined data area, the sector length of the specified track is $2 \times \pi \times N$ (N is a positive integer) times the track pitch, and the head positions of the specified tracks are lined up at equal track distances (intervals) on the predetermined radius line.

In such structure as mentioned above, even through the CLV disc format is the complete one, since the head portions of the sector are lined up at the equal track distances on the radius line and the number of the sectors contained in the tracks increases successively by a constant number with a constant period (frequency), it is possible to realize the CLV optical disc capable of easily performing the calculative conversion of the information number and the tracks number and accessing the information with high speed without damaging the data capacity.

In the CLV optical disc utilizing the CLV method according to the second embodiment, the track including the head sector in the predetermined data area is the specified track.

In such structure as mentioned above, even though the embodiment includes the complete CLV disc format, since the sector head portions are lined up at the equal track distances on the radius line, and the number of the sectors contained in the track including the head sector successively increases by the constant number with the constant track period (frequency), it is possible to manufacture the CLV disc format such that the unevenness thereof is eliminated between the optical disc media, and it is further possible to specify the target track by the calculative conversion of the same information number and tracks number from each other. Consequently, the CLV optical disc capable of accessing the information with high speed.

Third Embodiment

The third embodiment of the CLV optical disc according to the present invention is described concretely in detail hereinafter, referring to the accompanying drawings. In a spiral track of equal pitch formed by the CLV driving, the railroad track length L of the entire track thereof is expressed by a below equation (1).

$$L = \pi \times (r^2 - Ro^2)/P \quad (1)$$

$$r = Ro + n \times p (n=1,2,3,\ldots) \quad (2)$$

Here, as shown in FIG. 4, the symbol Ro represents the radius position of starting the spiral, r represents the radius position of the spiral for intending to measure the railroad track length L, P represents the spiral track pitch, and n represents the number of the tracks.

An equation (3) shown below can be obtained from the above equations (1) and (2):

$$L = 2 \times \pi \times Ro \times n + n^2 \times \pi \times P (n=1,2,3 \ldots) \quad (3)$$

$$L = 2 \times \pi \times Ro + (2 \times n - 1) \times \pi \times P (n=1,2,3, \ldots) \quad (4)$$

From the equation (4), it is apparent that the railroad track length difference between the adjacent tracks is constant as shown below:

$$[\text{Railroad Track Length Difference between the Adjacent Tracks}] = 2 \times \pi \times P = \text{constant} \quad (5)$$

Here, assuming that a sector head position on a track is taken as a standard position and an increasing railroad track length ($\text{sumdL}_m$) is obtained at the position preceding by m tracks, the relationship between the increasing railroad track length and the other constants is expressed by the following equation (6):

$$\text{sumdL}_m = 2 \times \pi \times P (1+2+3+\ldots+m) = \pi \times P \times m(m+1) \quad (6)$$

If the sector head position on a track is also taken as the standard position and the adjacent track length difference of the increasing railroad track length ($\text{sumdL}_m$) is obtained at the position preceding by in tracks from the equation (6), the relationship between the adjacent track length difference and the other constants is expressed by the following equation (7'):

$$dL_m = \text{sumdL}_m - \text{sumdL}_m - 1 = 2 \times \pi \times P \times m \quad (7')$$

Consequently, when marks are attached onto the spiral track therealong at a constant interval, the distance (dLm) between the marks located at the adjacent tracks becomes increased when the marks are parted from the standard track. Assuming that, now, the distance between the marks is equal to an integral multiple (n) of the length ($2 \times \pi \times P$), the marks are parted in order from the standard track, and dLm becomes equal to the distance between the marks, the distance between the adjacent track marks may become equal to 0 (zero) and the same variation of the distance between the adjacent track marks is repeated again.

Next, the structure and operation of the respective embodiments constructed on the above-mentioned spiral track are described, in order, hereinafter.

In the structure of the CLV disc format of the third embodiment according to the present invention, the marks (track marks) of a fixed length previously set (predetermined) are arranged on the information track formed in the state of a spiral at an equal physical interval. In such structure, as shown in FIGS. 5, 6, 7A and 7B, the present track position can be calculated and specified from the distance between the track marks on the adjacent tracks. Here, the track mark can be correctly set to a detectable length even though the revolution rate of the disc is not equal to the predetermined revolution rate at the time of reproducing. Furthermore, as shown in FIG. 8, since the track mark length has been already made equal to the previously set fixed length, the distance between the practical adjacent track marks can be precisely obtained by the (equivalent) conversion from the distance information between the adjacent track marks which is measured on the basis of the above-mentioned length.

Consequently, although the sector length is made equal to an integral multiple of the length ($2 \times \pi \times P$) in the third embodiment of the present invention, it is not always necessary to make the length equal to an integral multiple thereof. Namely, the track seeking operation can be performed with the value not equal to an integral multiple thereof in the present invention.

However, on that occasion, although the distance varies on the variation line of the distance between the adjacent track mark, the distance therebetween is not made precisely equal to 0 (zero), or the distance between the adjacent track marks precisely equally change per each of the respective zones.

Fourth Embodiment

Figure 9:
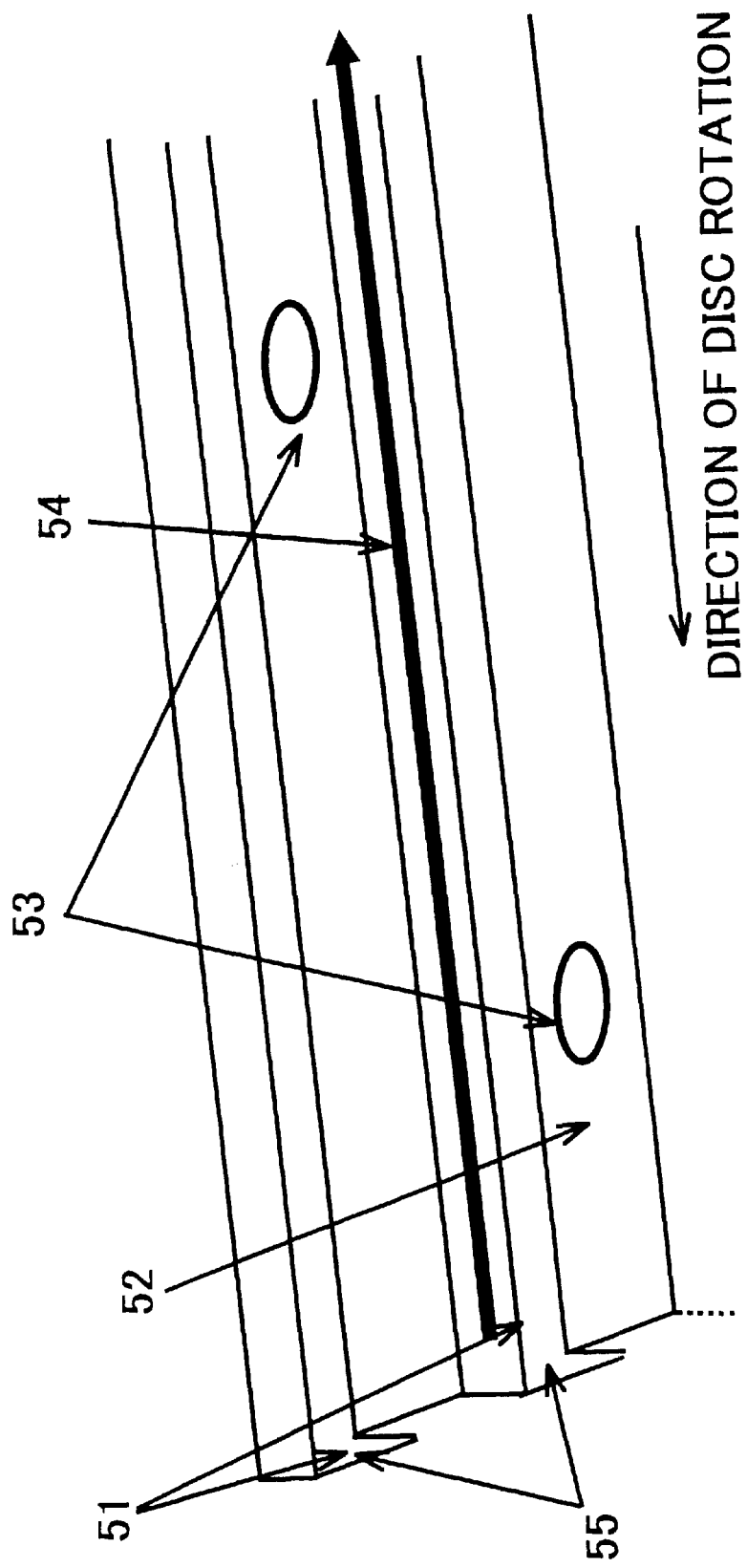
FIG. 9 is a diagram illustrating the track marks provided on the land portion in the fourth embodiment according to the present invention.

The fourth embodiment of the present invention is a structure of arranging track marks 53 at an equal physical interval on the land portions 52 along the groove portions 51 for recording or reproducing the information formed in the state of a spiral as shown in FIG. 9. As in the case of the third embodiment, the position of the present track mark can be calculated and specified from the distance between the track marks on the adjacent information track 55.

Fifth Embodiment

In comparison with the abovementioned CLV disc formats of the third and fourth embodiments, the fifth embodiment obtains the present track information from the information of the rough track position and track mark length and the distance information between the adjacent track marks, and thereby realizes a high-speed seeking operation.

Figure 7A:
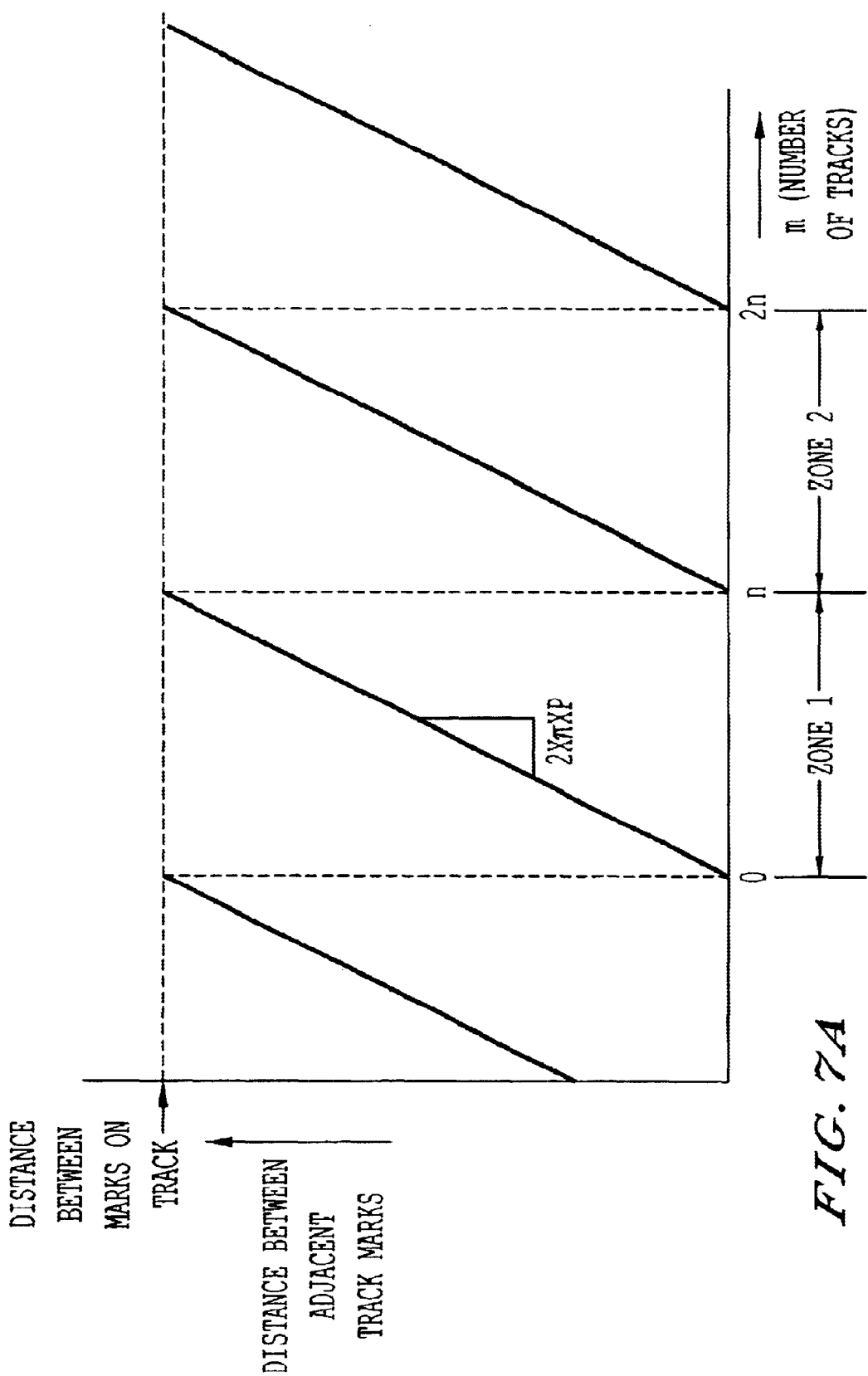
FIGS. 7A and 7B are explanatory diagrams for explaining the state of the arrangement between the adjacent track marks and the variation of the distance therebetween in the third embodiment.
Figure 7B:
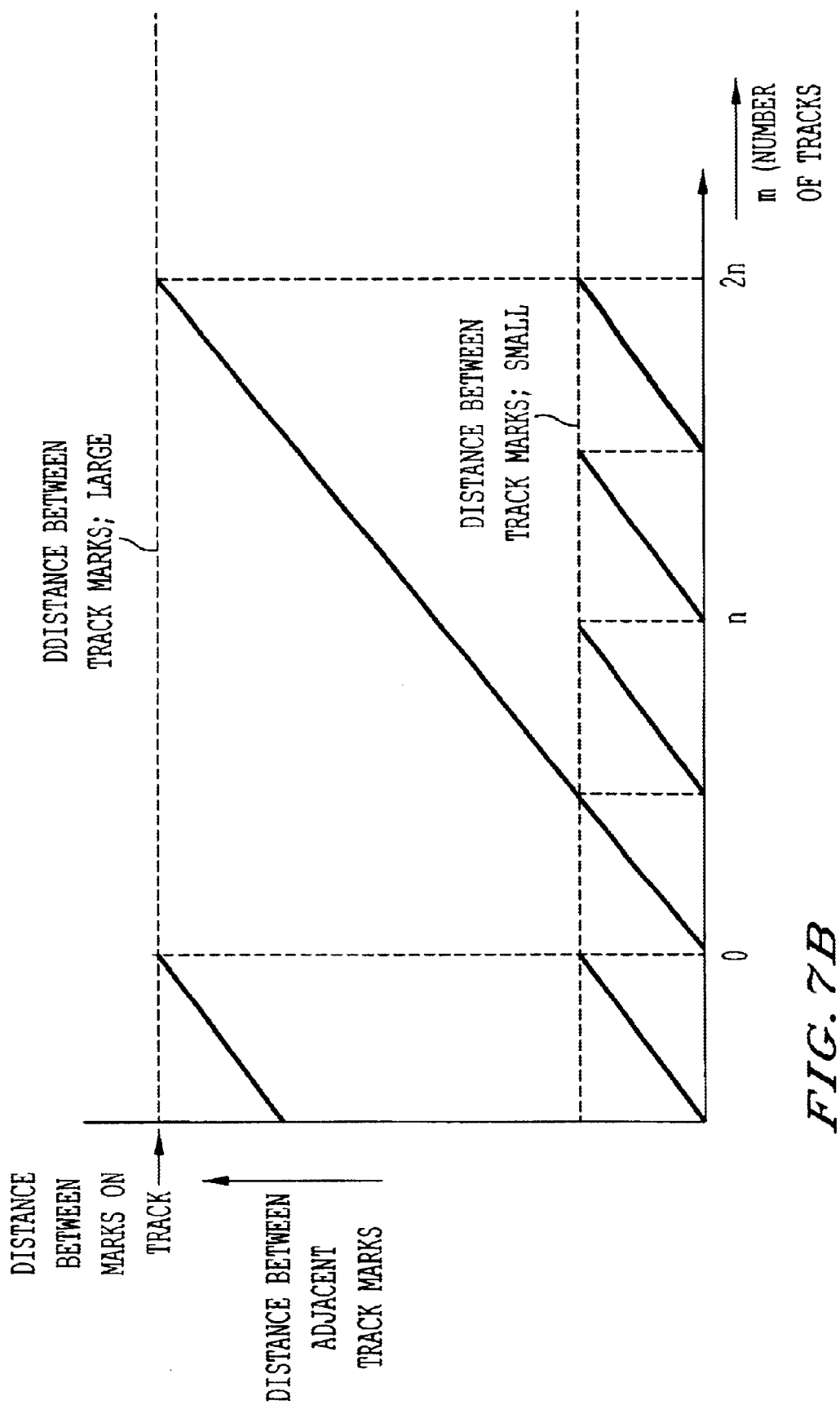
Figure 8:
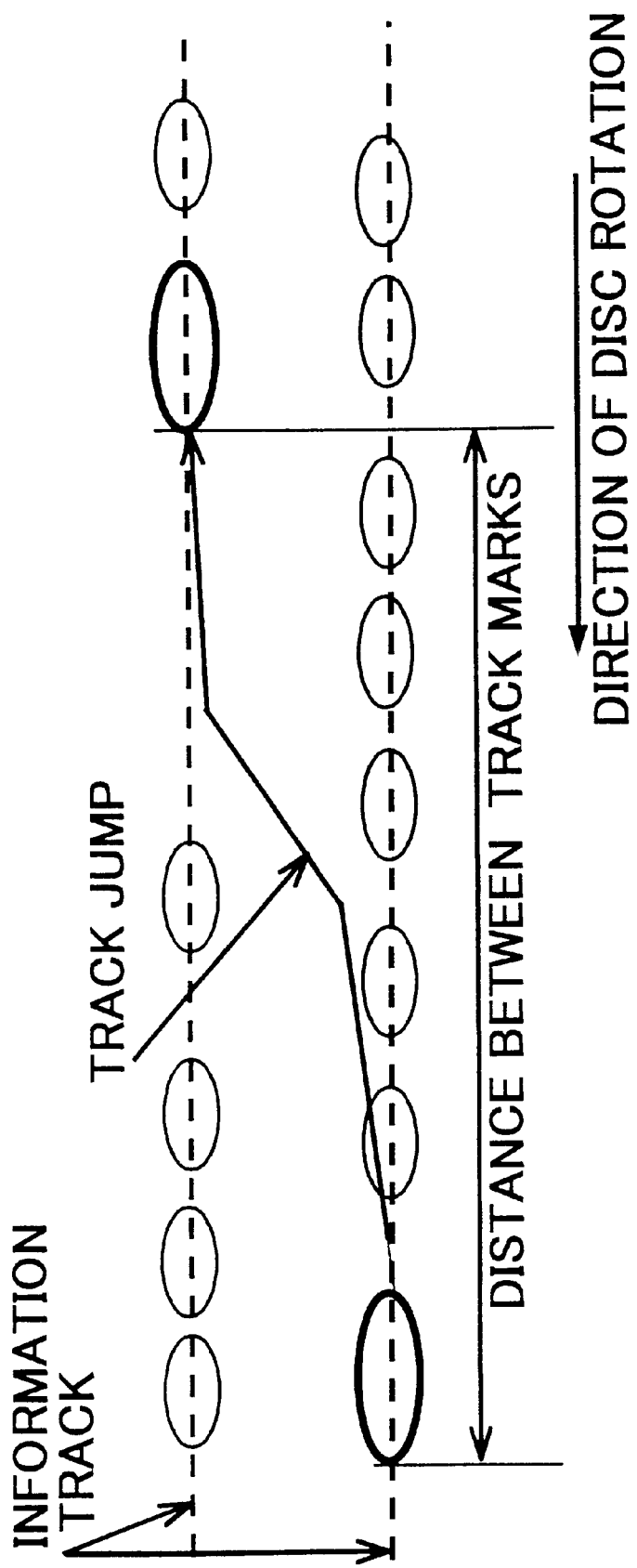
FIG. 8 is a diagram illustrating the track marks in the information track in the third embodiment.

As to the CLV disc formats of the third and fourth embodiments, as shown in FIGS. 7A and 7B, the disc format operates in accordance with the setting of the distance between the track marks. However, in FIG. 7A showing the variation of the distance between the same adjacent track marks at the time of being parted from the standard track mark, if the distance between the track marks is large in the zones 1, 2, . . . , the zones are merged into one and thereby the distance between the adjacent track marks and the track position can be made corresponding to each other one by one in the disc. Furthermore, as shown in FIG. 7B, if the distance between the track marks is small, the number of the zones increases. Consequently, in the entire disc, the zone is specified employing the same adjacent track position information, and thereby the track is also specified from the information of the distance between the adjacent tracks.

Figure 10:
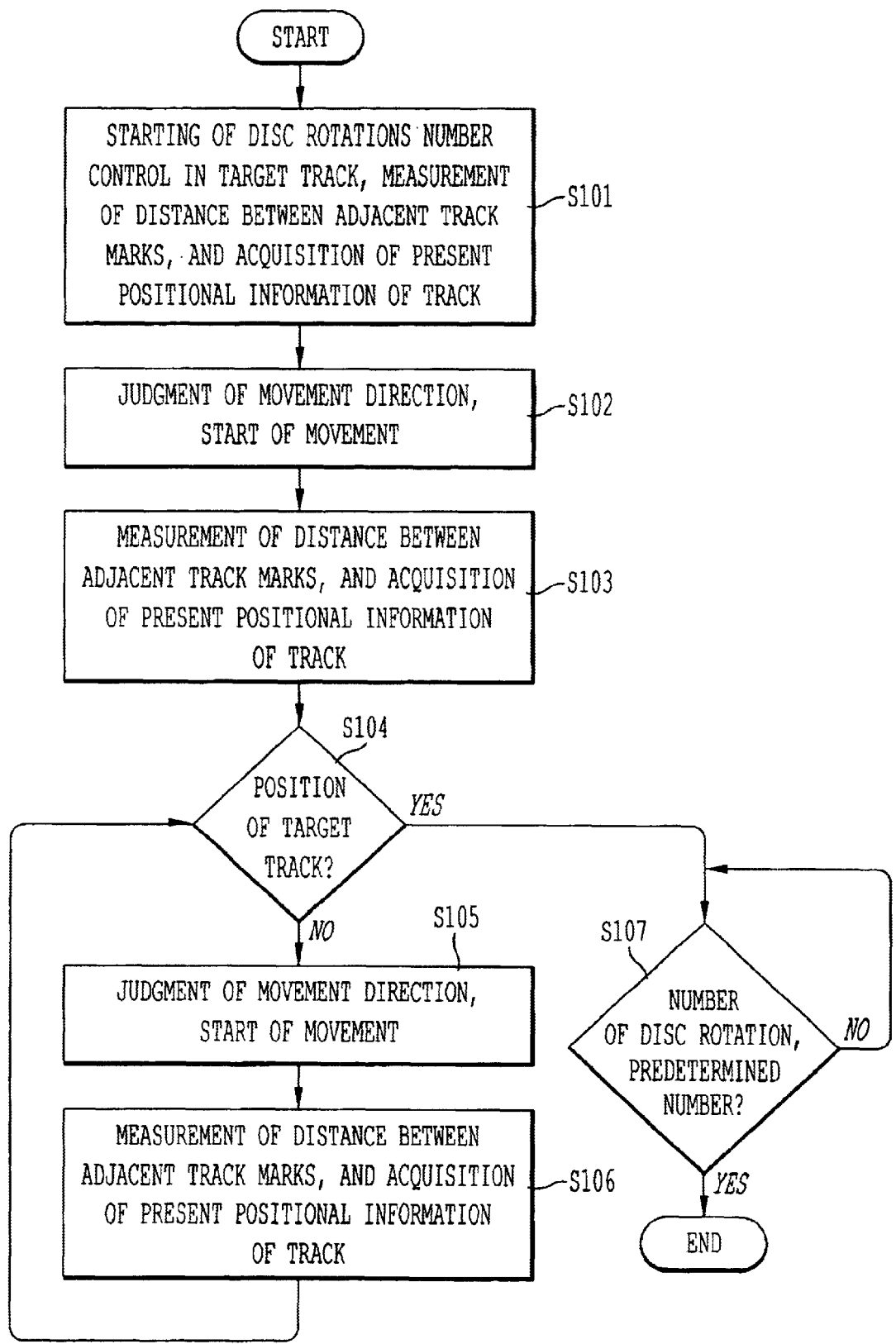
FIG. 10 is a flowchart for explaining the operation of the track seeking in the fifth embodiment according to the present invention.
Figure 11A:
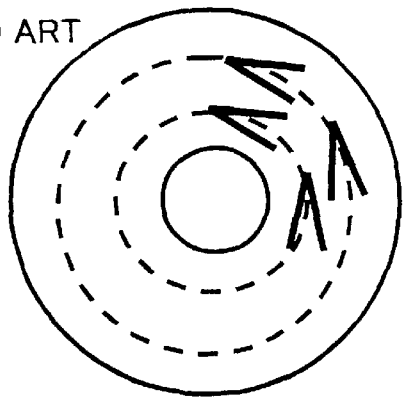
FIGS. 11A, 11B, and 11C are diagrams respectively illustrating the state of the general (background-art) disc format.
Figure 11B:
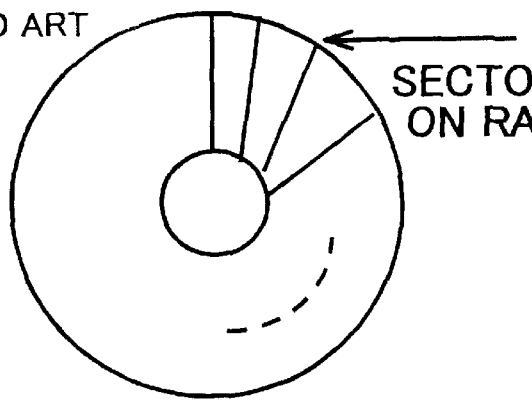
Figure 11C:
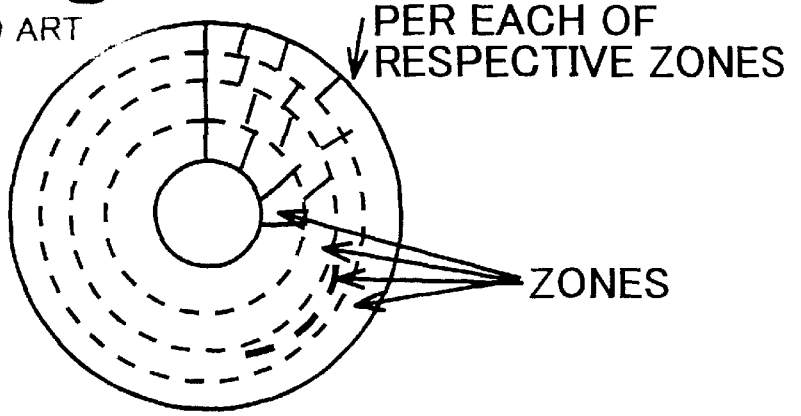

Moreover, the seeking operation of the fifth embodiment is explained below in accordance with the operational flow as shown in FIG. 10.

At first, when the target address is given, the pickup acquires the present track position information. Namely, the control of rotation is started in accordance with the disc revolution number corresponding to the target track position. In the state of rotating the disc, the present track position information is acquired by the measurement of the distance between the adjacent track marks (step S101).

Next, the direction of the pickup movement is judged and the pickup movement is started (step S102). During this time period, the setting operation to the revolution number at the target address position of the disc revolution number progresses in the similar way. In such state, performing the acquisition of the present track position information, the pickup gradually approaches the target track. At that time, the distance between the adjacent track marks is measured (step S103). When the pickup is not located at the target position, the judgment of the movement direction, the movement start, and the measurement of the distance between the adjacent track marks are repeated every time. When the pickup is located at the target position, the revolution number of the disc becomes equal to the predetermined revolution number. At this time, the track seeking operation is completed (steps S104~S107).

Moreover, at the time of acquiring the track position, it is not always necessary to make the revolution number of the disc equal to the predetermined revolution number corresponding to the present track. The track position information can be obtained also by equivalently converting the distance between the track marks which is previously set. Here, the track mark is correctly set to the detectable length at the time of reproducing even though the revolution number of the disc is not equal to the predetermined revolution number. In such way as mentioned above, the seeking operation to the address according to the fifth embodiment can be executed without performing any predetermined rotation control operation corresponding to the track under the seeking operation. Therefore, the access to the target address can be done with further high speed. When the plural zones showing the variation of the distance between the same adjacent tracks exist in the disc, the movement of the pickup to the vicinity of the zone is completed in the step S102, utilizing the rough track position information.

Sixth Embodiment

The sixth embodiment of the invention is the structure of the CLV disc format in the aforementioned third and fourth embodiments in which the track mark length is made equal to an integral multiple n of "the 2π(track pitch) length" or the one n-th (n; a positive integer) of the same length. In such way of setting, the distance between the track marks can be judged by measuring the integral multiple of the track mark length. Consequently, it turns out to be possible to further simply and precisely acquire the distance between the adjacent track marks.

Seventh Embodiment

The seventh embodiment of the invention is the structure of the CLV disc format in the aforementioned third and fourth embodiments in which the track marks are arranged on the head sectors of the logical track made up of a predetermined number of sectors. Consequently, those track marks can be commonly used for the both purposes of acquiring the track position information and detecting the logical track.

Eighth Embodiment

The eighth embodiment of the invention is the structure of the CLV disc format in the aforementioned third and fourth embodiments in which the track marks are arranged per each of the respective sectors and the distance between the track marks is equal to the sector length. Consequently, those track marks can be commonly used for the both purposes of acquiring the track position information and detecting the sector.

Ninth Embodiment

The ninth embodiment of the invention is the structure of the CLV disc format in the aforementioned third and fourth embodiments in which the distance between the track marks is made equal to one n-th (n; a positive inieger) of the sector length. Consequently, the variation area of the distance between the adjacent track marks becomes short and the track position information can be acquired with further short time.

Tenth Embodiment

The tenth embodiment of the invention is the structure of the CLV disc format in the aforementioned third and fourth embodiments or sixth through ninth embodiments in which there is additionally formed the code for specifying the zones divided into plural areas on the track mark of the disc format. In the above zones, the distance between the same adjacent track marks changes in the radius direction of the disc. The rough track position information as shown in the fifth embodiment is not required. The present track position information is obtained from the track mark length information, the distance information between the adjacent track marks, and the above-mentioned code. Thereby, the seeking operation can be realized with the high speed.

The present invention is not always limited to above-mentioned embodiments. It is needless to mention that various sorts of modifications or variations as described in the above embodiments can be realized or equally converted to the others.

Summarized Description of the Third Through Tenth Embodiments

As is apparent from the foregoing description, the present invention can demonstrate the advantageous superior functional effects as mentioned hereinafter.

To state in more detail, according to the present invention, the seeking operation to a specified address is performed on the information track formed in the state of a spiral, and the disc revolution rate is controlled to the line velocity on the target track position. Thereby, in the state that the line velocity does not always coincides with that on the present track position, the track position information such as the present track position, the detected track mark on the half-way of the seeking operation, and the adjacent track position can be obtained by the detection of the track mark on the present track by use of the reproducing beam spot, the track jumping to the adjacent track, and the operation of detecting the track mark on the track.

Furthermore, in the seeking operation to a specified address in the CLV disc format featured in that the track marks are arranged at an equal physical length interval on the land portion along the groove track for recording or reproducing the information formed in the state of a spiral, the disc revolution rate is controlled to the line velocity on the target track position. Thereby, in the state that the line velocity does not always coincides with that on the present track position, the track position information such as the present track position and the track position information midway through the seeking operation can be obtained by the operation of detecting the track mark and the other track mark on the adjacent track in the state of tracking the present track by use of the reproducing beam spot.

Otherwise, the tracking position information is obtained from the rough track position information and the distance information between the track marks, and thereby the seeking operation can be realized with high speed. When the distance between the track marks on the adjacent tracks is measured in the CLV disc format, the measuring operation can be simply and precisely performed. Furthermore, in the CLV disc format, when a logical track is formed by a predetermined number of sectors and the seeking operation is done to the track, the track position information specified by the distance between the track marks on the adjacent tracks and the logical track position information acquired from the track marks can be obtained and commonly used. Furthermore, in the CLV disc format, when the seeking operation is done to a specified sector, the track position information specified by the distance between the track marks on the adjacent tracks and by the sector position information acquired from the track marks attached to the respective sectors can be obtained and commonly used. Furthermore, in the CLV disc format, when the seeking operation is done to a specified track position, the completion of measuring the distance between the track marks can be done in a short time. Thereby, the seeking operation can be performed with high speed. Furthermore, in the CLV disc format, the code for specifying the zones divided into plural areas in the radius direction of the disc corresponding to the same variation of the distance between the track marks can be additionally formed without requiring any medium for specifying the rough present track position.

Eleventh Embodiment

Figure 12:
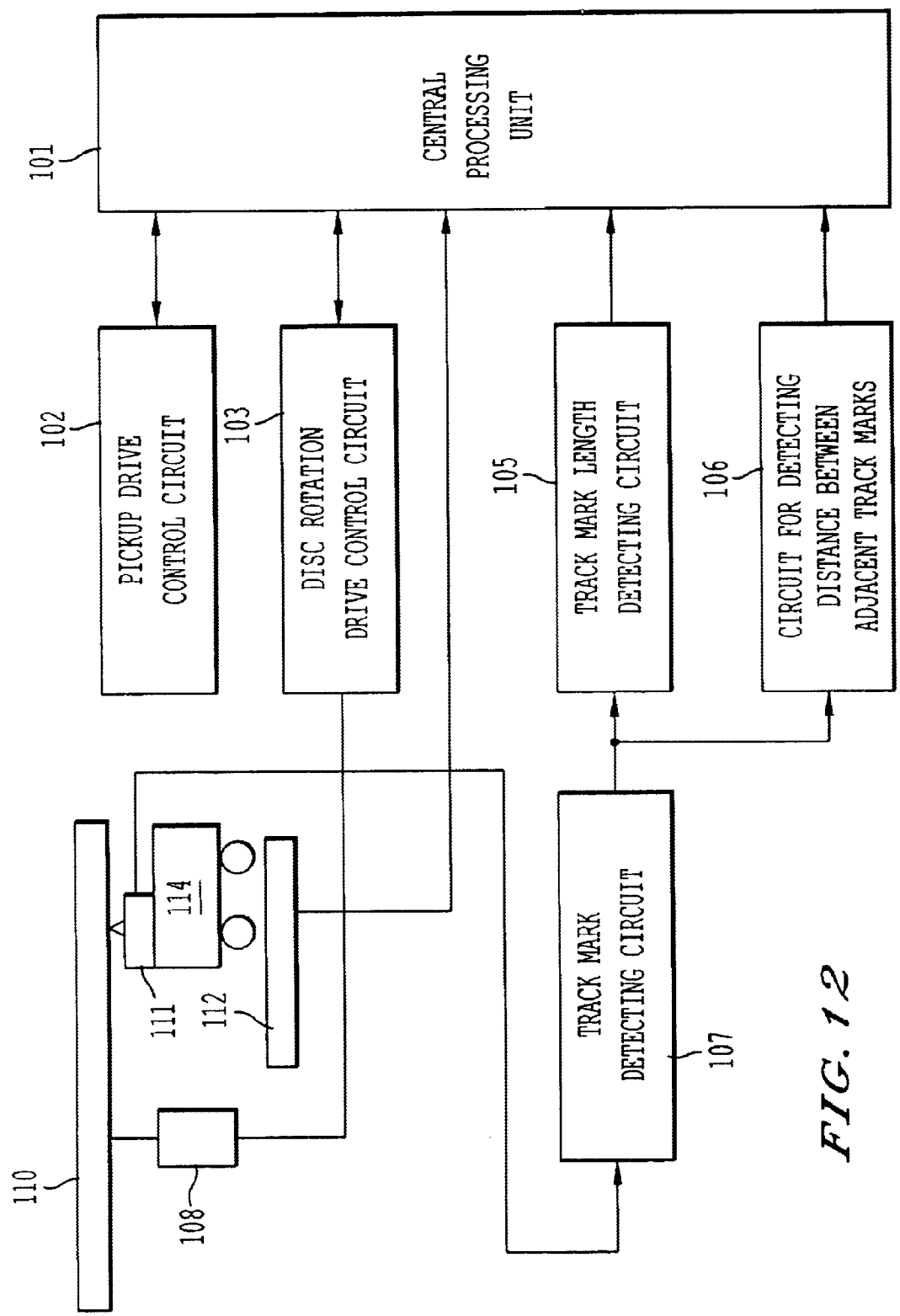
FIG. 12 is an explanatory block diagram for explaining the structure of the eleventh embodiment according to the present invention.
Figure 13:
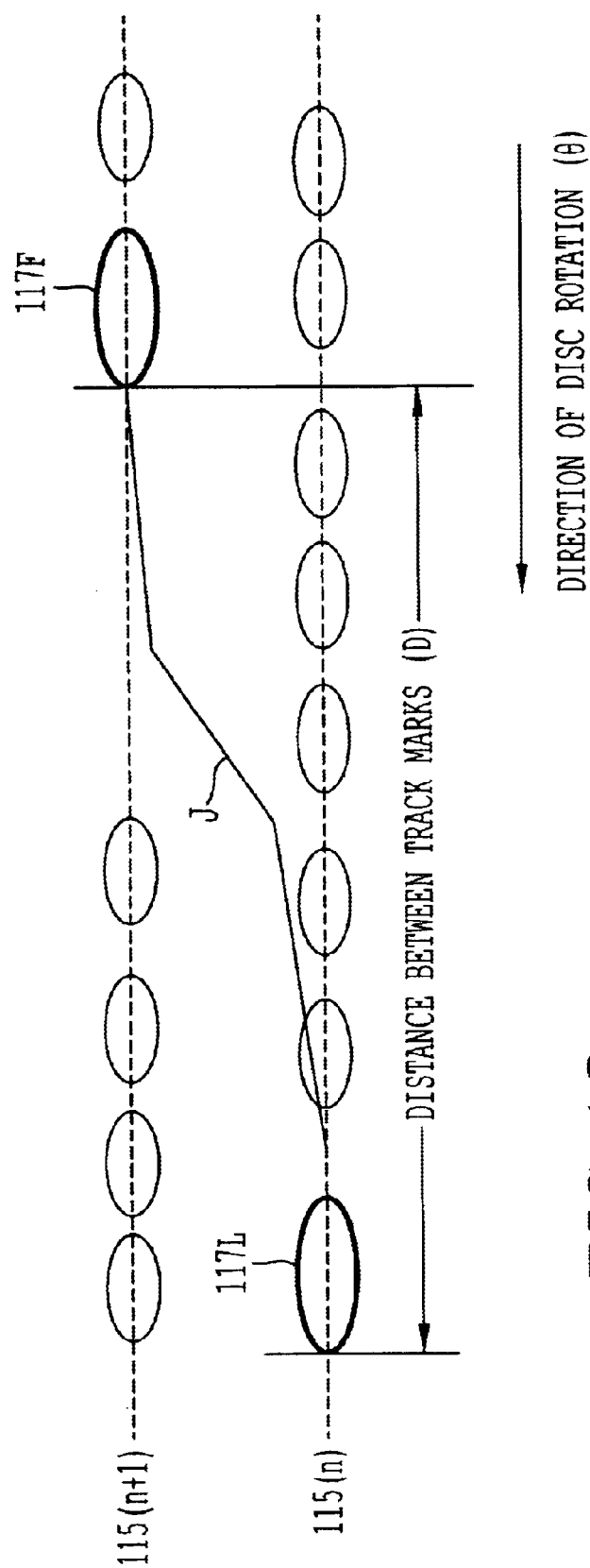
FIG. 13 is an explanatory diagram for explaining the structure of the track of the optical disc medium in the eleventh embodiment.
Figure 14:
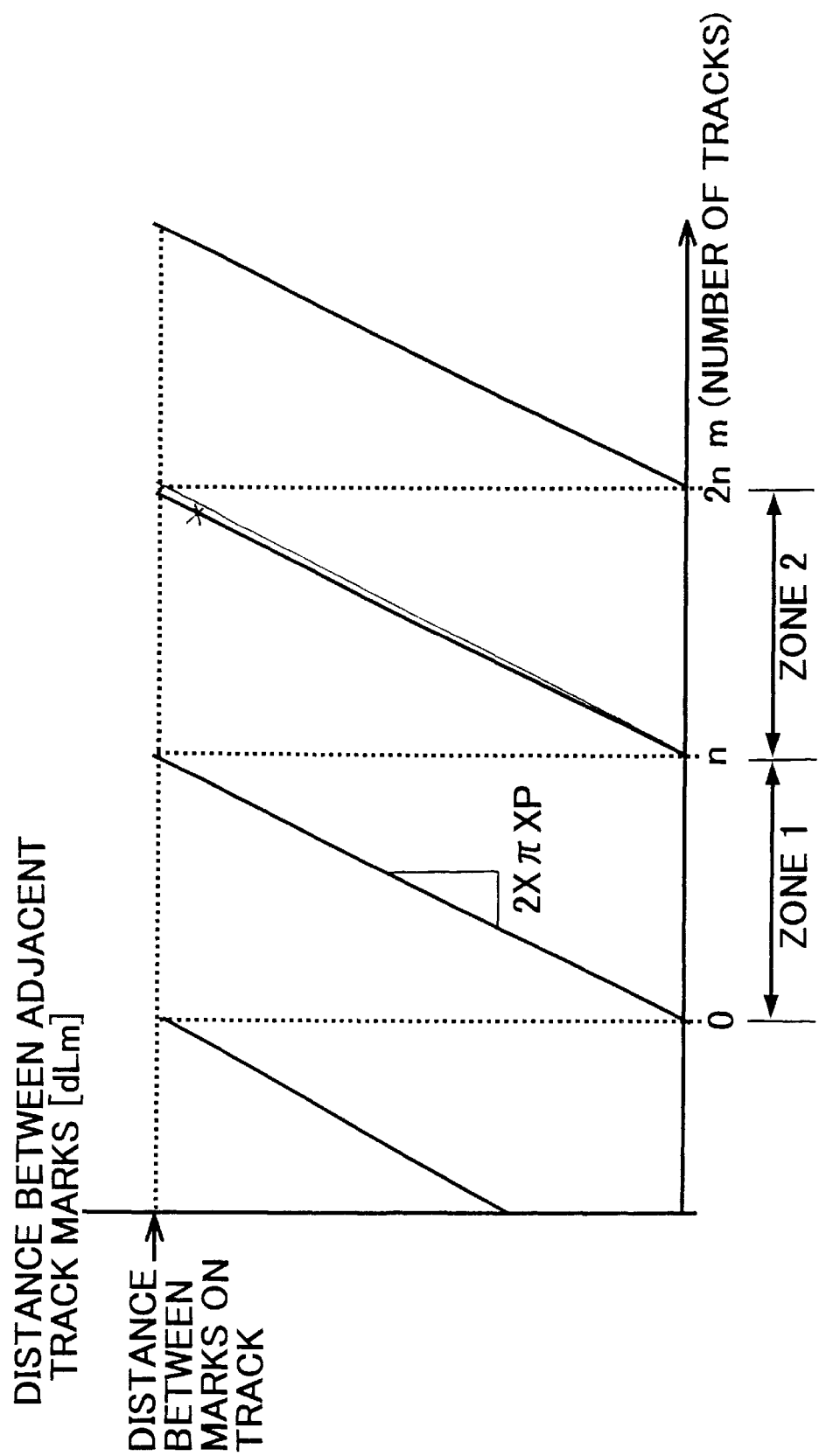
FIG. 14 is a property diagram illustrating the property of the distance between the adjacent track marks in the eleventh embodiment.
Figure 15:
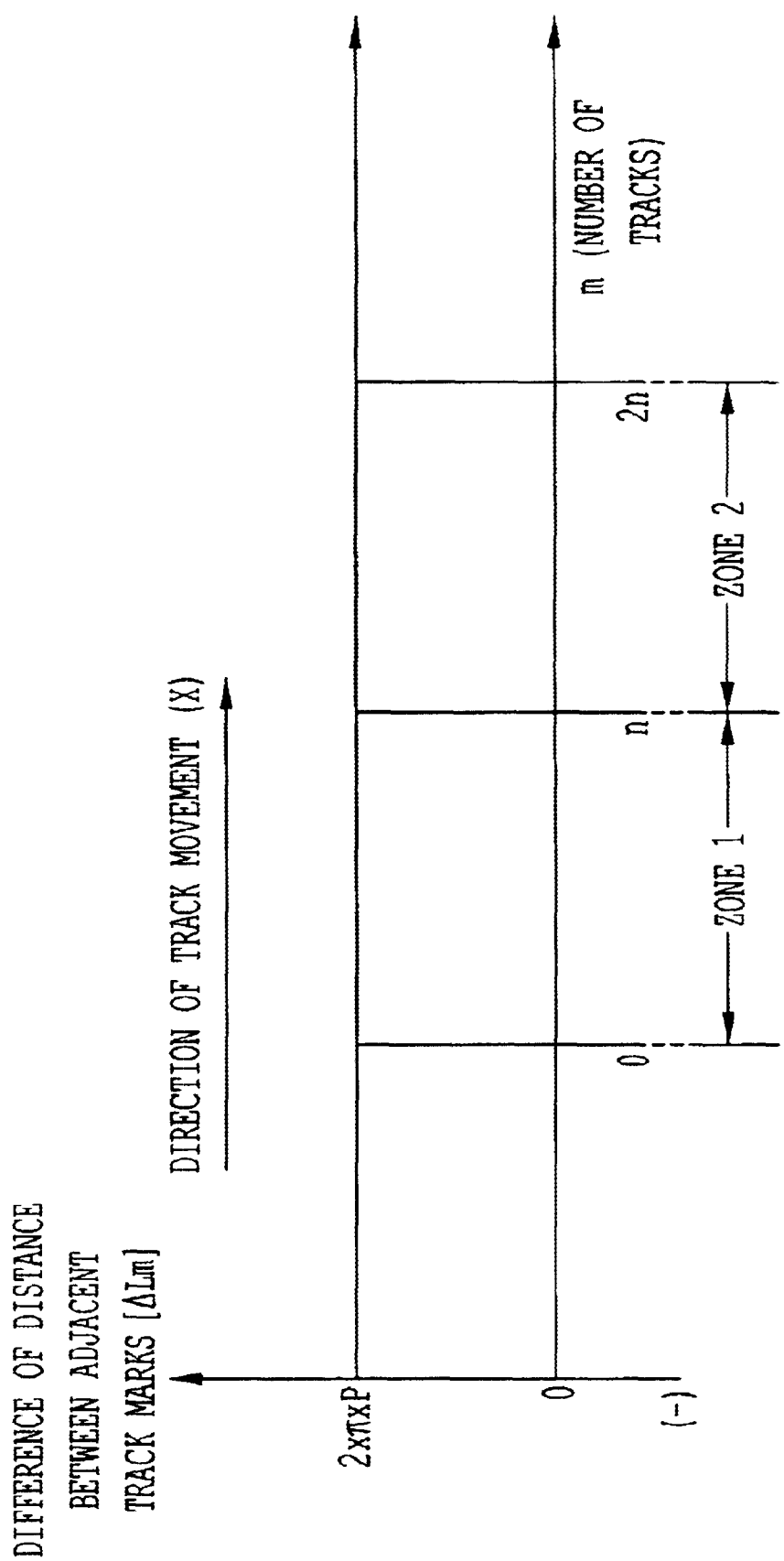
FIG. 15 is a property diagram illustrating the property of the difference value of the distance between the adjacent marks in the eleventh embodiment.

The eleventh embodiment of the present invention is described, referring to FIGS. 12 through 15. FIG. 12 is a block diagram for explaining the structure of the eleventh embodiment. FIG. 13 is an explanatory diagram for explaining the structure of the track on the optical disc of the eleventh embodiment. FIG. 14 is a property diagram for explaining the property of the distance between the adjacent track marks. FIG. 15 is a property diagram for explaining the property of the difference value of the distance between the adjacent marks of the eleventh embodiment.

As shown in FIG. 12, in the eleventh embodiment, a disc rotating motor 108 is attached to an optical disc 110 and the motor rotatively drives the optical disc 110 around the center position thereof. A disc rotation drive control circuit 103 for controlling the drive of the disc rotating motor 108 with a rotation speed inversely proportional to the radius of the track utilizing the CLV method is connected to the disc rotating motor 108. A spiral track is formed on the optical disc 110 and track marks are arranged at a predetermined interval along the spiral track. Furthermore, a pickup 111 is disposed on the optical disc 110 so as to be opposed thereto. The pickup 111 radiates the laser light onto the optical disc 110 and receives the light reflected from the optical disc 110 and thereby performs the recording and reproducing of the information on the optical disc 110. A conveying motor 114 for conveying the pickup 111 in the radius direction of the optical disc 110 is attached to the pickup 111, and a pickup drive control circuit 102 for controlling the conveyance of the pickup 111 is connected to the conveying motor 114.

A pickup position detector 112 for detecting the position of pickup 111 in the radius direction of the optical disc 110 is disposed for the pickup 111. The position detector 112 is provided with an optical detection mechanism. The amount (intensity) of the light received by the optical detection mechanism changes linearly corresponding to the position of the pickup in the radius direction of the optical disc 110. The position detector has a function of detecting the position of the pickup 111 in the radius direction of the optical disc 110 on the basis of the received light intensity.

Furthermore, a track mark detecting circuit 107 is connected to the pickup 111, and detects the track marks arranged at a predetermined interval along a spiral track formed on the optical disc 110. A track mark length detecting circuit 105 for detecting the track mark length and a distance detecting circuit 106 for detecting the distance between the track marks on the adjacent tracks are both connected in parallel with each other to the track mark detecting circuit 107.

Furthermore, a central processing unit (CPU) 101 is provided for controlling the entire operation of the apparatus. The pickup drive control circuit 102, the disc rotation drive control circuit 103, the pickup position detector 112, the track mark length detecting circuit 105, and the distance detecting circuit 106 for detecting the distance between the adjacent track marks are respectively connected to the central processing unit (CPU) 101. Furthermore, in the central processing unit (CPU) 101, there is further provided a distance calculating medium for calculating and compensating the distance between the track marks on the adjacent tracks. To state further concretely, the track mark length detecting circuit 105 detects the detection time of predetermined-length track mark, and the line speed of the pickup 111 on the radius position is guided out from the above detection time, and then, the distance between the track marks on the adjacent tracks detected by the distance detecting circuit 106 for detecting the distance between the adjacent track marks is calculated and compensated by the above-mentioned distance calculating medium.

The CLV optical disc of the eleventh embodiment according to the present invention is described concretely in detail, hereinafter. In a spiral track of equal pitch P formed on the optical disc 110, the railroad track length L of the entire track thereof is expressed by below equations; (1) and (2).

$$L=\pi \times (r^2-Ro^2)/P \tag{1}$$

$$r=Ro+n \times p (n=1,2,3, \ldots ) \tag{2}$$

Here, as shown in FIG. 4, the symbol Ro represents the radius on the position of starting the spiral, r represents the radius on the position of the spiral for intending to measure the railroad track length L, P represents the spiral track pitch, and n represents the number of the tracks.

An equation (3) shown below can be obtained from the above equations (1) and (2):

$$L=2\times \pi \times Ro \times n + n^2 \times \pi \times P (n=1,2,3, \ldots ) \tag{3}$$

From the equation (3), the railroad track length Ln of the respective tracks can be expressed by an equation (4).

$$Ln=2\times \pi \times Ro+(2\times n-1)\times \pi \times P(n=1,2,3, \ldots ) \tag{4}$$

From the equation (4), it is apparent that the railroad track length difference L between the adjacent tracks can be expressed by an equation (5").

$$L=2\pi \times Ro+(2n-1)\times \pi \times P-[2\pi \times Ro+\{(2n-1)-\}\times \pi \times P]=2\times \pi \times P \tag{5"}$$

When the head position of a specified sector on the standard position is taken as a standard position and the increasing railroad track length (sumd$L_m$) is obtained at the position preceding by m tracks, the relationship between the increasing railroad track length and the other constants is expressed by the following equation (6):

$$\text{Sum}dL_m = 2 \times \pi \times P(1+2+3+\ldots+m) = \times \pi \times P \times m(m+1) \quad (6)$$

From the equation (6), the track length difference dLm between the adjacent tracks at the position preceding by m tracks is expressed by an equation (7").

$$dL_m = \pi \times P \times m(m+1) - \pi \times P(m-1)\{(m-1)+1\} = 2 \times \pi \times P \times m \quad (7")$$

In the eleventh embodiment, since the track marks are arranged at a constant interval along the spiral track, the distance between the track marks on the adjacent tracks may become longer by the railroad track length difference L between the adjacent tracks as shown in the equation (5") when the track number increases.

And then, when the distance between the track marks becomes equal to the adjacent track length difference $dL_m$ at the position preceding by m tracks as shown in the equation (7"), the distance between the track marks on the adjacent tracks becomes 0 (zero), and then, the distance between the track marks starts again to increase linearly from zero. The variation area of the distance between the adjacent track marks repeated per n tracks is called "zone", hereinafter. The zone is composed of zone 1, zone 2, . . . .

In the respective zones, the distance between the adjacent track marks linearly increases with the gradient (inclination) or the difference of $2\pi P$. FIG. 15 shows the relationship of the difference $dL_m$ of the distance between the adjacent track marks and the respective zones. The difference $dL_m$ of the distance between the adjacent track marks takes a constant value $2\pi P$ in the area between the zones. Namely, the difference dLm of the distance between the adjacent track marks takes the constant value $2\pi P$ in the area of the respective zones, and the difference $dL_m$ of the distance between the adjacent track marks takes negative value only on the bordering position of the zone.

The track seeking operation of the eleventh embodiment is described hereinafter. When a target address is given to the apparatus from the host computer, the operation of controlling the revolution rate of the CLV mode for the optical disc 110 due to the control of the revolution rate of the disc rotating motor 108 is started by the disc rotation drive control circuit 103 so as to obtain a predetermined line speed on the target track, under the command of the central processing unit (CPU) 101.

The detection of the track mark by use of a track mark detecting circuit 107 and the detection of the position of the pickup 111 are performed at the same time. The track mark length detecting signal from the track mark length detecting circuit 105, the track mark distance signal from the circuit 106 for detecting the distance between the adjacent track marks, and the position detecting signal from the position detector 112 are respectively inputted to the central processing unit (CPU) 101.

In the central processing unit (CPU) 101, the zone in which the pickup 111 is situated is detected on the basis of the position detecting signal, and at the same time the line speed of the pickup 111 on the present position of the track is guided out from the track mark length detecting signal. The distance between the track marks obtained from the track mark distance signal is calculated and compensated on the basis of the obtained line speed thereof. In such way, the present distance between the track marks can be guided out. On the other hand, in the central processing unit (CPU) 101, the track information of the present position of the pickup 111 can be acquired from the detected zone and the guided-out distance between the track marks.

Next, in the central processing unit (CPU) 101, the direction of conveying the pickup 111 is judged from the acquired track information and the target address and CPU 101 gives an instruction to the pickup drive control circuit 102 to cause a pickup conveying motor 114 to perform the driving operation by use of the pickup drive control circuit 102. As shown in FIG. 13, when the pickup 111 is conveyed in the conveyance direction relating to the judgment, the conveying operation is performed, as shown by the track jump orbit J, from the information track 115 (n) to the adjacent information track 115 (n+1), and the subsequent conveying operations are performed in order in the similar way to the other adjacent information track in the judgment conveyance direction.

In the process of such conveyance, the present distance between the track marks is calculated by the central processing unit (CPU) 101 in the same manner as mentioned before, and whether or not the pickup 111 is situated on the target track position is judged from the track information obtained on the basis of the distance between the track marks thus calculated.

When the pickup 111 is judged not to be situated on the target track position, the judgment of the conveying direction and the conveyance in the judged direction are repeated for the pickup 111 by the central processing unit (CPU) 101 until the pickup 111 is judged to arrive at the target track position in such manner as mentioned before. Since a series of processing steps are performed by the CPU 101 regardless of (independently from) the setting control of the CLV mode of the disc rotating motor 108, according to the eleventh embodiment, the seeking operation of the pickup 111 to the target track position can be performed promptly in terms of a short (time) period, regardless of the CLV mode setting control of the optical disc 110.

In such way, according to the eleventh embodiment, the zone in which the pickup 111 is situated is detected by the control processing unit 101 on the basis of the position detecting signal from the position detector 112. The distance between the track marks on the present adjacent tracks is calculated and compensated on the basis of the track mark information detected by the track mark detecting circuit 107. Thereby, the track information regarding the present position of the pickup 111 is acquired. The direction of conveying the pickup 111 is judged from the acquired track information and the target address. The operation of driving the conveying motor 114 by the pickup drive control circuit 102 is repeated until the pickup 111 is judged to arrive at the target track position. However, since a series of such processing are performed independently from the CLV mode setting control of the disc rotating motor 108 by use of the disc rotation drive control circuit 103, the seeking operation of the pickup 111 to the target track position can be performed for a short period without waiting the completion of the CLV mode setting control for the optical disc 110.

Twelfth Embodiment

Figure 16:
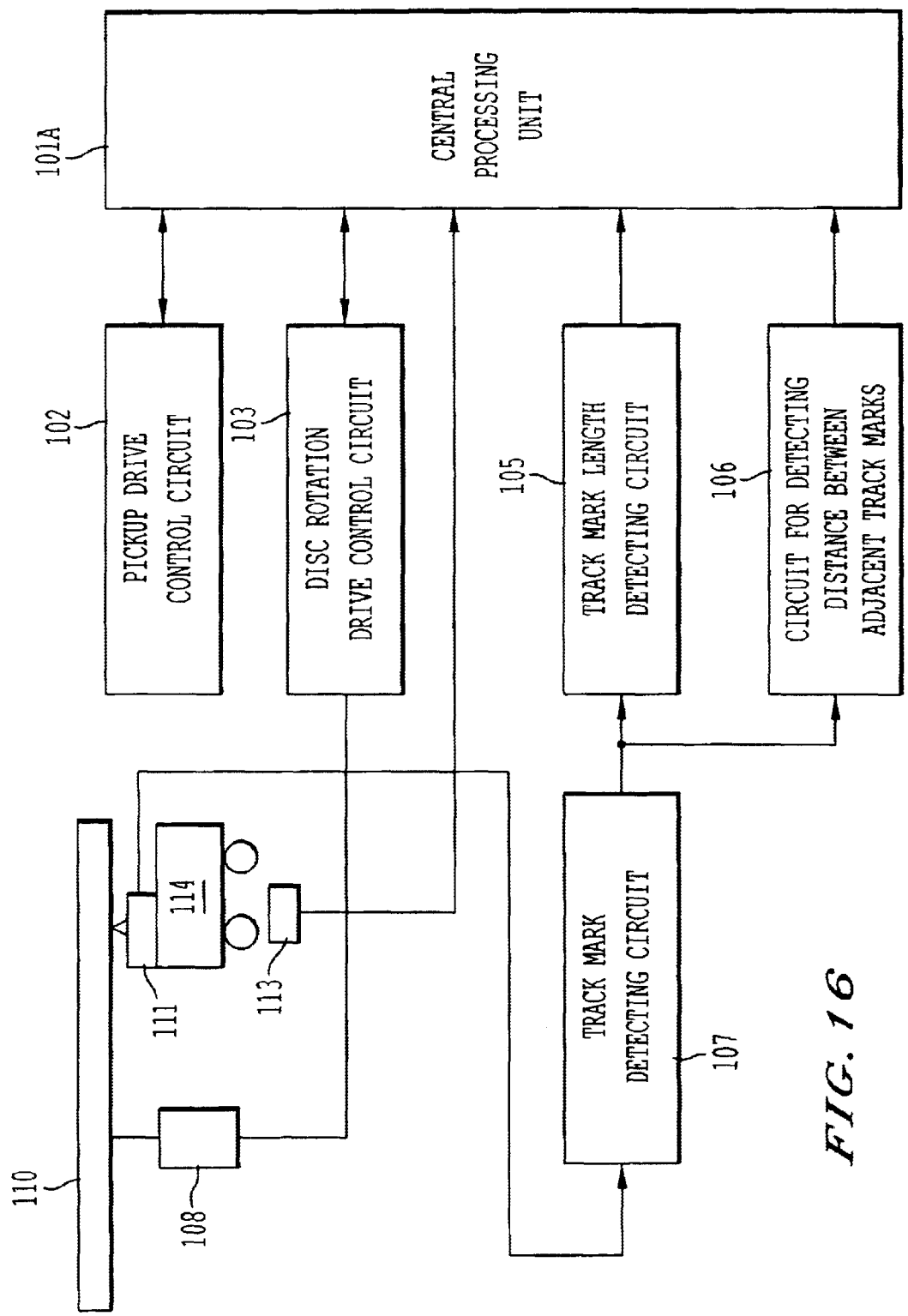
FIG. 16 is an explanatory block diagram for explaining the structure of the twelfth embodiment according to the present invention.

The twelfth embodiment of the present invention is described, referring to FIG. 16. FIG. 16 is an explanatory block diagram for illustrating the structure of the twelfth embodiment according to the present invention.

As shown in FIG. 16, in the twelfth embodiment, a standard position detector 113 for optically detecting the standard position of the pickup 111 is provided instead of the position detector 112 of the eleventh embodiment which has been already explained referring to FIG. 12. In the central processing unit (CPU) 101A, there is provided a zone detecting member for monitoring the difference $2\pi P$ of the difference between the adjacent track marks, detecting and calculating the boundary position of the zone where the difference $dL_m$ of the distance between the adjacent track marks takes a negative value excluding $2\pi P$, and detecting the zone where the pickup 111 is situated on the basis of the standard position detecting signal from the standard position detector 113 and the counting signal on the boundary position of the zone.

Since the structure of the other parts of the twelfth embodiment is same as that of the eleventh embodiment described before, the overlapped explanation thereof is omitted here.

In the twelfth embodiment, at the time of the track seeking operation, the presence of the pickup 111 at the standard position is detected by the central processing unit (CPU) 101A from the standard position detecting signal from the standard position detector 113, the boundary position of the zone where the difference $dL_m$. of the distance between the adjacent track marks takes the negative value excluding $2\pi P$ by the monitoring of the difference of the distance between the adjacent track marks, the zone where the pickup 111 is situated is detected, and the distance $dL_m$ between the adjacent track marks is calculated. In such way as mentioned heretofore, the track information can be acquired in the zone.

Since the other operation of the twelfth embodiment is same as that of the eleventh embodiment described before, the overlapped explanation thereof is omitted here.

In such way as mentioned heretofore, in the twelfth embodiment, although the presence of the pickup 111 at the standard position is detected from the standard position detecting signal from the standard position detector 113, the boundary position of the zone where the difference $dL_m$ of the distance between the adjacent track marks takes the negative value excluding $2\pi P$ by the monitoring of the difference of the distance between the adjacent track marks, the zone where the pickup 111 is situated is detected, since it is sufficient only to dispose, for example, a photosensor as the standard position detector 113, the structure of the entire apparatus can be made further simplified and the manufacturing cost can be reduced, in addition to the functional effect obtained in the eleventh embodiment.

Summarized Description of the Eleventh and Twelfth Embodiments

As is apparent from the foregoing description, the present invention can demonstrate the advantageous superior functional effects as mentioned hereinafter.

According to the eleventh embodiment, the spiral track having the track marks arranged thereon is formed in the optical disc medium. The pickup is conveyed by the conveying motor. The operation of recording and reproducing the information on the optical disc medium is performed by the pickup in the state of rotation in the CLV mode by the action of the rotation motor of the optical disc medium. In such structure, the distance between the track marks on the adjacent tracks is calculated by the distance calculating medium on the basis of the detection information of the track mark detected by the pickup. The position of the pickup in the radius direction of the optical disc medium is detected by the position detecting medium. The control of conveying the pickup onto the position of the target address is practiced regardless of (independently from) the setting with the CLV mode by the rotation motor by use of the conveyance control medium on the basis of the distance data between the track marks calculated by the calculation medium and the position data detected by the position detecting medium. Consequently, the conveyance of the pickup onto the position of the target address and the setting of the CLV mode are practiced in parallel, and thereby the seeking operation can be done with high speed.

According to the twelfth embodiment, the spiral track having the track marks arranged thereon is formed in the optical disc medium. The pickup is conveyed by the conveying motor. The operation of recording and reproducing the information on the optical disc medium is performed by the pickup in the state of rotation in the CLV mode by the action of the rotation motor of the optical disc medium. In such structure, the distance between the track marks on the adjacent tracks is calculated by the distance calculating medium on the basis of the detection information of the track mark detected by the pickup. The position of the pickup in the radius direction of the optical disc medium is calculated by the position calculating medium on the basis of the standard position detected by the standard position detecting medium. The control of conveying the pickup onto the position of the target address is practiced regardless of (independently from) the setting with the CLV mode by the rotation motor by use of the conveyance control medium on the basis of the distance data between the track marks calculated by the calculation medium and the position data of the pickup in the radius direction of the optical disc medium calculated by the position calculating medium. Consequently, the conveyance of the pickup onto the position of the target address and the setting of the CLV mode are practiced in parallel, and thereby the seeking operation can be done with high speed and the position detecting mechanism for detecting the position of pickup can be simplified.

Thirteenth Embodiment

The thirteenth embodiment of the CLV optical disc according to the present invention is described concretely in detail hereinafter, referring to the accompanying drawings. In a spiral track of equal pitch P formed on the optical disc 110, the railroad track length L of the entire track thereof is expressed by below equations; (1) and (2).

$$L=\pi \times (r^2-Ro^2)/P \tag{1}$$

$$r=Ro+n\times p (n=1,2,3,\dots) \tag{2}$$

Here, as shown in FIG. 4, the symbol Ro represents the radius on the position of starting the spiral, r represents the radius on the position of the spiral for measuring the railroad track length L, P represents the spiral track pitch, and n represents the number of the tracks.

An equation (3) shown below can be obtained from the above equations (1) and (2):

$$L=2\times \pi \times Ro \times n + n^2 \times \pi \times P (n=1,2,3,\dots) \tag{3}$$

From the equation (3), the railroad track length Ln of the respective tracks can be expressed by an equation (4).

$$Ln=2\times \pi \times Ro+(2\times n-1)\times \pi \times P(n=1,2,3,\dots) \tag{4}$$

From the equation (4), it is apparent that the railroad track length difference between the adjacent tracks is constant as shown below:

$$[\text{Railroad Track Length Difference between the Adjacent Tracks}]=2\times \pi \times P=\text{constant} \tag{5}$$

The equation (2) expresses the spiral orbit to be sought as a unit of the track, namely, as a one unit of the rotation angle 2π of the spiral orbit along the railroad track from the center of the spiral. As the result, the length of the rail road track increases by 2πP per each of the respective tracks.

Assuming that, instead of 2π, an optional angle $\theta_c$ is used as the one unit, the equation (2) can be expressed by the below equation (6''')

$$r = Ro + (s \times \theta_c) \times p/(2 \times \pi) \quad (n=1,2,3,\ldots) \qquad (6''')$$

Here, s is the number of the segments. The angle $\theta_c$ may be allowed to be set a large value or a small value. In the present invention, the line segment on the spiral railroad cut down (broken) by the angle $\theta_c$ is called a "segment".

From the equations (1) and (6'''), the following relationships {equations (7''') and (8''')} can be obtained:

$$L = Ro \times (s \times \theta_c) + P \times (s \times \theta_c)^2/(4 \times \pi) \quad (s=1,2,3,\ldots) \qquad (7''')$$

$$L_s = Ro \times \theta_c + P \times (2 \times s - 1) \times \theta_c^2/(4 \times \pi) \quad (s=1,2,3,\ldots) \qquad (8''')$$

From the equation (8'''), it can be understood that the railroad track length difference between the adjacent tracks is constant as shown below:

[Railroad Track Length Difference between the Adjacent Tracks]=
$$P \times \theta_c^2/(2 \times \pi) = \text{constant} \qquad (9''')$$

The present invention provides an accurate CLV drive controlling method utilizing the above-mentioned relationships. The thirteenth embodiment of the invention is concretely described hereinafter.

Figure 17:
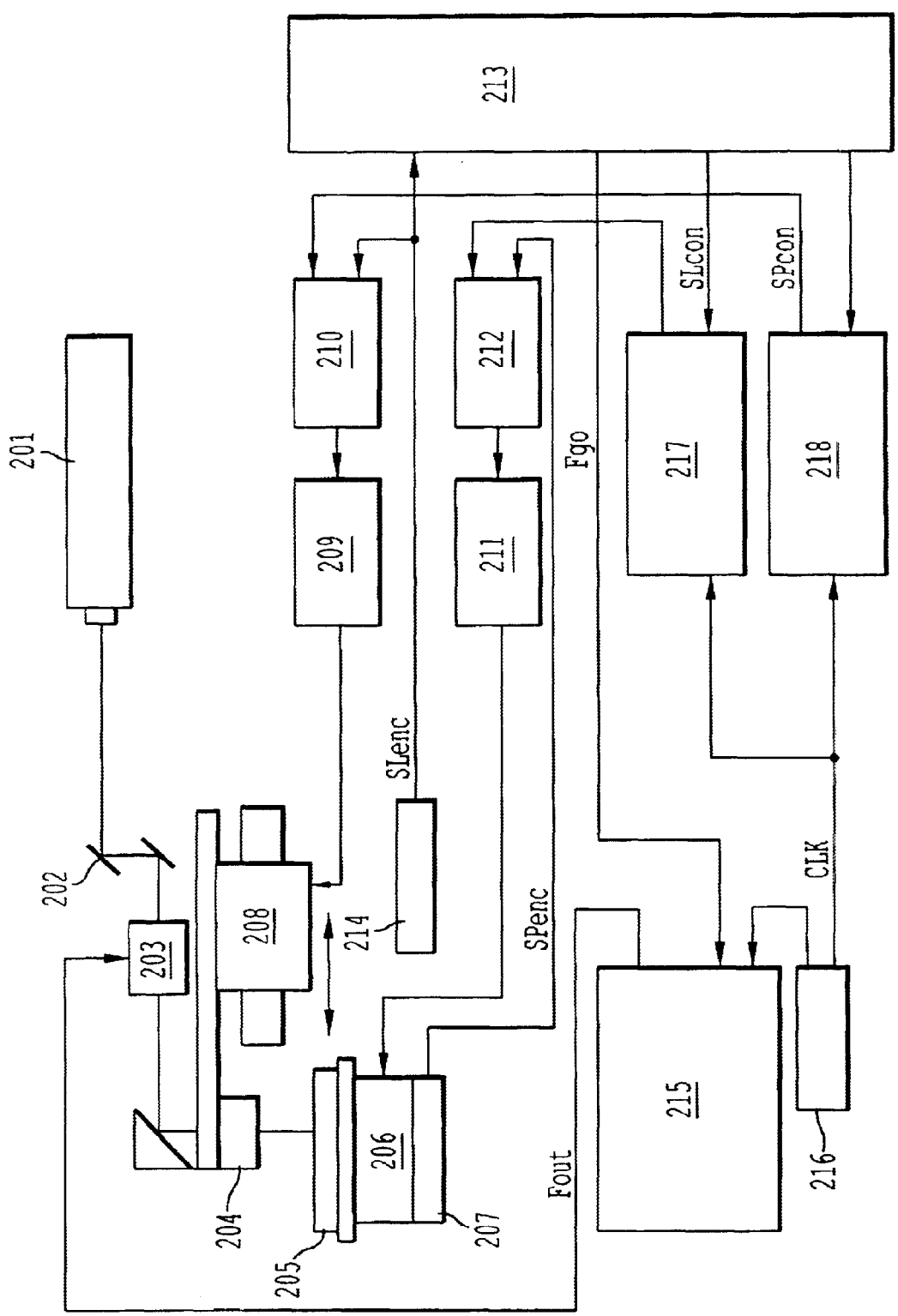
FIG. 17 is an explanatory block diagram for explaining the structure controlling the CLV drive in the thirteenth through twenty-second embodiment according to the present invention.

FIG. 17 is block diagram for explaining the entire structure of the CLV drive control system relating to the thirteenth embodiment of the optical disc cutting machine. The structure of the cutting machine main body composed of the respective sections 201 through 216 and the operation thereof are both same as those of the background art which have been already described.

Figure 22:
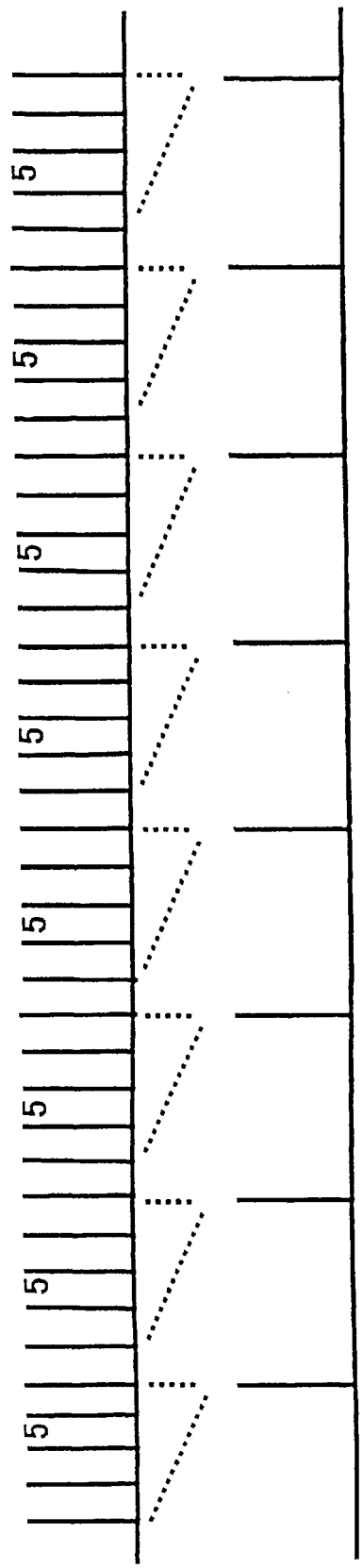
FIG. 22 is an explanatory timing chart for explaining the method of obtaining the frequency-demultiplied pulse.

In FIG. 17, the reference numerals 217 and 218 respectively represent a spindle drive ordering pulse generating circuit and a slider drive ordering pulse generating circuit. The operation of those circuit is to divide the frequency of the pulse train A of an optional number Na and output the pulse train B of another optional number Nb. A method of mixing the frequency-demultiplied pulses of different period and obtaining the pulses of the optional number as shown in FIG. 22. Eight frequency-demultiplied pulses are obtained from forty two fundamental pulses (a) in FIG. 22. There are various methods to be thought regarding such method of mixing intercalary pulse(s). For instance, Japanese Patent No. 02710853 and Japanese Laid-open Patent Publication No. 06-18726 disclose a pulse generator capable of practicing a method of obtaining a pulse train with high accuracy and low jitter according to such a method.

Noticing the equation (5), in the present invention, the value Na of the above-mentioned pulse generator is increased by the length of (2×π×P) per each of the respective tracks in coincidence with the track length increased by the length of (2×π×P) per one revolution of the spindle, and thereby a CLV drive ordering pulse train is generated. The above-mentioned matter can be expressed by the following equation:

$$2 \times \pi \times P/L_{cb} = N_{pa \cdot s} \qquad (10''')$$

In the equation (10'''), Lcb is the minimum physical unit length for forming a format on the disc. Data bit, sector, and track, etc. can be formed with the integer times of the unit length. In the right side of the equation (10'''), since the decimal fraction part thereof generally becomes equal to an infinitely small value, the value is expressed by "Npa·s" in order to distinguish that from the integer value "Npa".

Here, assuming that the integer part of Npa·s is Na, the decimal fraction part thereof is $\hat{a}_1$, and the (piece) number on a specified track m corresponding to Lcb is Ntm·s, the integer part and the decimal fraction part of the increase Lcb number per each of the respective tracks are shown in FIG. 23 (TABLE 1).

TABLE 1

| Track No. | L$_{cb}$ Number per One Track (Integer Part) | Remaining Difference of Track (Decimal Fraction Part) |
|---|---|---|
| m | Ntm | |
| m + 1 | Ntm + Npa | + α |
| m + 2 | Ntm + 2 × Npa | + 2 × α |
| m + 3 | Ntm + 3 × Npa + 1 | + 0.3 × α |
| m + 4 | Ntm + 4 × Npa | + 1.3 × α |
| ... | ... | ... |

Here, the number Ntm·s having the decimal fraction part of infinite decimal fraction values is generally expressed as the integer value Ntm in order to easily recognize the change of the track remaining difference. Furthermore, in the track of (m+3), since the integer part occurs in the remaining difference of the track, the integer part is incremented by "1" and the track length is made equal to the intercalery track length longer by Lcb Than the ordinary length. By performing such processing, the remaining difference of the track can be made decimal fraction and deviation of the track length from the ideal CLV drive railroad track length can be corrected. In practice, adding the decimal fraction part of Ntm·s to the entire number, the intercalary track is created. The drive ordering pulse train per each of the respective tracks can be created from the pulse train made by adding the above-mentioned pulses of the increasing Lcb number (of the integer part) to the pulses of "Ntm" (the pulse number on the track m).

Figure 18:
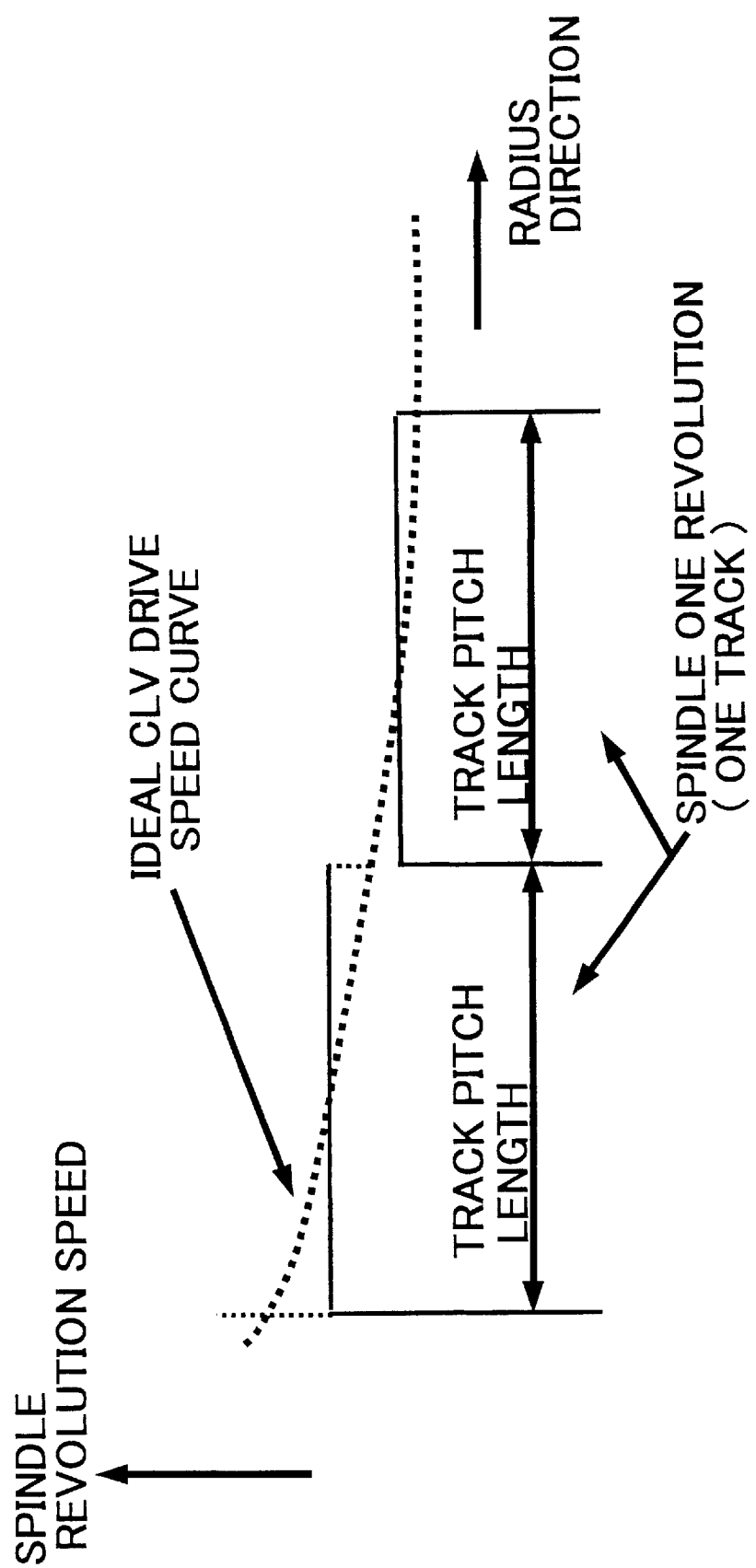
FIG. 18 is a diagram for explaining the CLV speed ordering (1)

When the pulse generator is constructed practically, the fundamental clock corresponding to one n-th (n; integer) of Lcb instead of Lcb in the equation (10''') is employed for the processing of pulse generator creation. In such way, it can be made possible to reduce the substantial length processed as the track remaining difference. Since the calculation of the track remaining difference part is performed with the finite column (figure), a cut-down (omitted) part may occur in the remaining difference part. The matter results in the accumulated error from the ideal CLV drive ordering. However, if the track remaining difference is calculated with sufficient column (figure), the CLV drive ordering pulse within the specified specification can be obtained sufficiently in spite of the occurrence of the accumulated error as mentioned above. The method of creating the pulse ignoring the track remaining difference is also included in the scope of the present invention. As the result, in the CLV drive controlling method according to the present invention (the thirteenth embodiment), the order of the speed as shown in FIG. 18 can be created. In such a CLV drive controlling method, regarding the radius position, it may be sufficient only to detect the CLV drive starting radius position. The radius position data are not required at all after starting the CLV.

Fourteenth Embodiment

The fourteenth embodiment of the CLV optical disc according to the present invention is described hereinafter, referring to the accompanying drawings.

The renewal of the Nb data corresponding to the increase of the segment length per a unit of segment in the CLV drive controlling method is performed by the CLV drive ordering pulse, in the CLV drive controlling method relating to the present embodiment.

Noticing the equation (9'''), in the present invention, the value Na of the pulse generator is increased by the number corresponding to the length of $\{P\times\theta_c^2/(2\times\pi)\}$ per each of the respective segments in coincidence with the segment length of $\{P\times\theta_c^2/(2\times\pi)\}$ per each of the same, and thereby the CLV drive ordering pulse train is created. The above matter can be expressed by the following equation:

$$P\theta_c^2/(2\times\pi)/L_{cb}=N_{pb\cdot s} \qquad (11''')$$

Here, assuming that the integer part of Npb·s is Nb, the decimal fraction part thereof is, and the number corresponding to $L_{cb}$ at a specified segment s is Nsg·s, the integer part and the decimal fraction part of the increasing $L_{cb}$ number per each of the respective segments are shown in FIG. 24 (TABLE 2).

TABLE 2

| Track No. | $L_{cb}$ Number per One Track (Integer Part) | Remaining Difference of Track (Decimal Fraction Part) |
|---|---|---|
| s | Nsg | |
| s + 1 | Nsg + Npb | + β |
| s + 2 | Nsg + 2 Npb | + 2 × β |
| s + 3 | Nsg + 3 × Npb + 1 | + 0.3 × β |
| s + 4 | Nsg + 4 × NpB | + 1.3 × β |
| . . . | . . . | . . . |

Here, the number Nsg·s having the infinite decimal fraction part in the decimal fraction part thereof is also generally expressed as the integer value Nsg. Furthermore, in the segment of (s+3), since the integer part occurs in the remaining difference of the segment, the integer part is incremented by "1" and the segment length is made equal to the intercalery segment length longer by $L_{cb}$ Than the ordinary length. By performing such processing, the remaining difference of the segment can be made a decimal fraction and deviation of the length from the ideal CLV drive railroad track length can be corrected.

Figure 19:
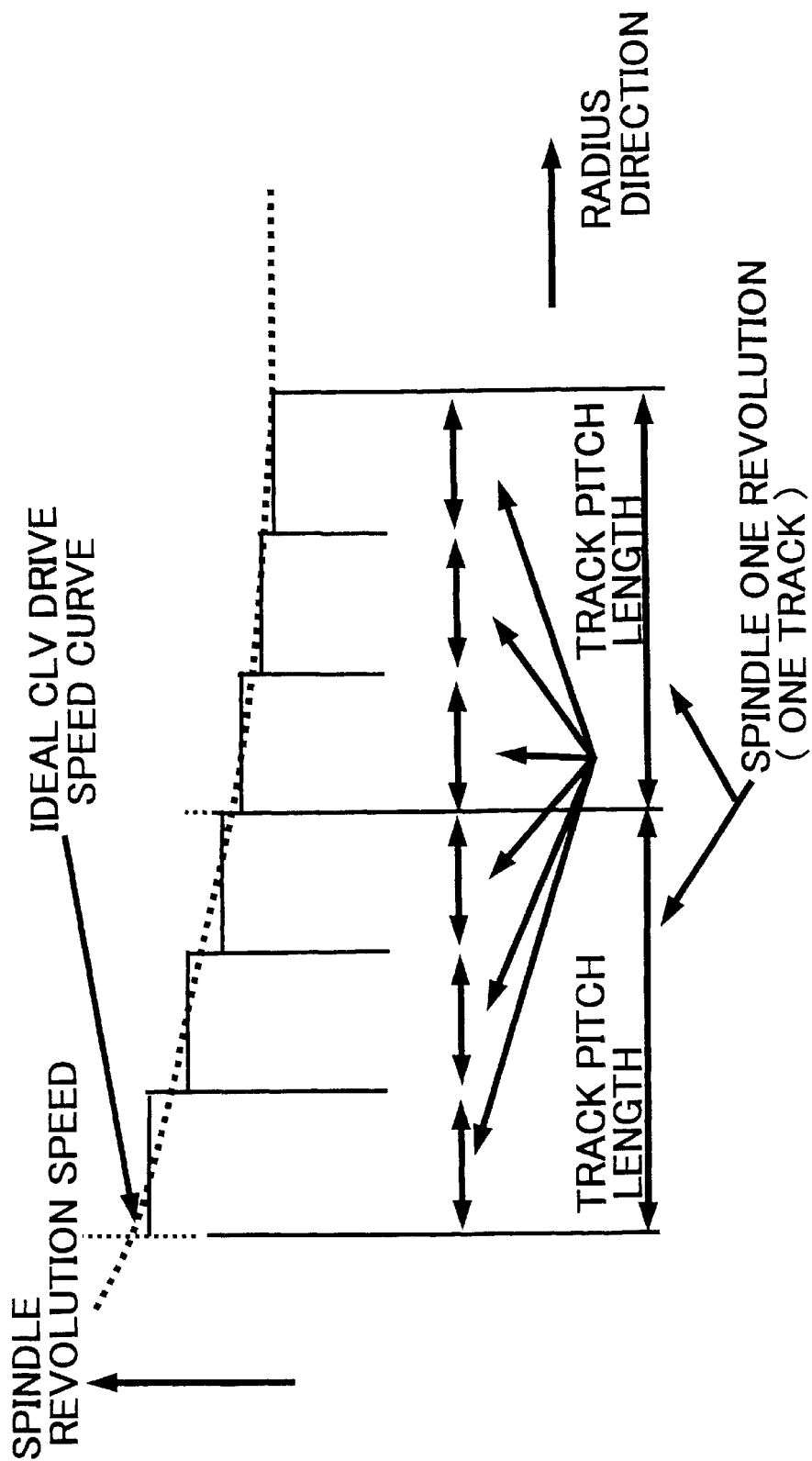
FIG. 19 is another diagram for explaining the CLV speed ordering (2)

The drive ordering pulse train per each of the respective segments can be crested from the pulse train made by adding the pulses of the above-mentioned increasing $L_{cb}$ number (of the integer part) to the pulses of the number "Nsg". When the pulse generator is practically constructed, the method of calculating the segment remaining difference part and the construction therefor are the same as described in the thirteenth embodiment of the present invention. The method of creating the pulse ignoring the segment remaining difference is also included in the scope of the present invention. As the result, in the CLV drive controlling method according to the present invention (the fourteenth embodiment), the order of the speed as shown in FIG. 19 can be created. FIG. 19 shows an example of ordering the drive at the time of performing the renewal of the data in the segment formed in the structure corresponding to the one made by equally dividing the one revolution of the spindle into three. In comparison with the order of the speed in the thirteenth embodiment, the local deviation (in the one revolution of the spindle) can be further reduced for the ideal drive ordering.

Fifteenth Embodiment

In the CLV format of the fifteenth embodiment, the track remaining difference (α) in FIG. 23 (TABLE 1) becomes "0(zero)". Consequently, the cut-off part of the track remaining part as mentioned before does not occur at all, and thereby the precise CLV drive ordering pulses can be obtained. Furthermore, even in case that the track remaining difference is not "0(zero)", it may be possible to obtain the CLV drive ordering pulses not including any accumulated error caused by (due to) the cut-off part in a similar way, when the physical fundamental length is set so as to become finite decimal fraction and thereby the cut-off part does not occur.

Sixteenth Embodiment

In the CLV format of the sixteenth embodiment, the track is replaced by the segment in FIG. 23 (TABLE 1). As in the case of the fifteenth embodiment (structure and operation), the segment remaining difference (β) may become "0(zero)", Consequently, the cut-off part of the segment remaining part as mentioned before does not occur at all, and thereby the precise CLV drive ordering pulses can be obtained. Furthermore, even in case that the segment remaining difference is not "0(zero)", it may be possible to obtain the CLV drive ordering pulses not including any accumulated error caused by (due to) the cut-off part in a similar way, when the physical fundamental length is set so as to become finite decimal fraction and thereby the cut-off part does not occur.

Seventeenth Embodiment

As is apparent from the aforementioned equation (4), the increasing part of the railroad length per each of the respective tracks becomes equal to "π×P" at the first track and equal to "2×π×P" at the second track and the all other tracks subsequent thereto. In the CLV disc format of the seventeenth embodiment, since the length "π×P" is set to the physical fundamental length so as to make that equal to the integer times of the aforementioned fundamental clock, the track remaining difference (α) in FIG. 23 (TABLE 1) may also become equal to "0(zero)". Consequently, the cut-off part of the segment remaining part as mentioned before does not occur at all, and thereby the precise CLV drive ordering pulses can be obtained. Furthermore, even in case that the segment remaining difference is not "0(zero)", it may be possible to obtain the CLV drive ordering pulses not including any accumulated error caused by (due to) the cut-off part in the similar way, when the physical fundamental length is set so as to become finite decimal fraction and thereby the cut-off part does not occur.

Eighteenth Embodiment

As is apparent from the aforementioned equation (8'''), the increasing part of the railroad length per each of the respective tracks becomes equal to "$P\times\theta_c^2/(4\times\pi)$" at the first segment and equal to "$P\times\theta_c^2/(2\times\pi)$" at the second segment and the all other segment subsequent thereto. In the CLV disc format of the eighteenth embodiment, since the length "$P\times\theta_c^2/(4\times\pi)$" is set to the physical fundamental length so as to make that equal to an integral multiple of the aforementioned fundamental clock, the segment remaining difference (β) in FIG. 24 (TABLE 2) may also become equal to "0(zero)". Consequently, the cut-off part of the track remaining part as mentioned before does not occur at all, and thereby the precise CLV drive ordering pulses can be obtained. Furthermore, even in case that the track remaining difference is not "0(zero)", it may be possible to obtain the CLV drive ordering pulses not including any accumulated error caused by (due to) the cut-off part in the similar way, when the physical fundamental length is set so as to become finite decimal fraction and thereby the cut-off part does not occur.

Nineteenth Embodiment

As is apparent from the aforementioned equation (3), assuming that the driving operation is started at the CLV disc format starting position "$R_o$" if the value "$2\times\pi\times R_o$" is not set to the fundamental physical length so as to make the length equal to an integral multiple of the aforementioned fundamental clock (namely, if the cut-off part occurs at the time of creating the pulse), the error occurring at this time appears with the 2×π×n times thereof at the subsequent time n tracks later.

In the CLV disc format of the nineteenth embodiment, since the value "2×π×$R_o$" is set to the fundamental physical length so as to make the length equal to an integral multiple of the aforementioned fundamental clock. As to the nineteenth embodiment, when the cut-off part does not occur with the finite decimal fraction, such case is also included in the embodiment. The track remaining difference at the time of creating the pulse becomes "0(zero)", at this time point. After starting the CLV drive, it is possible to obtain the CLV drive ordering pulse which does not cause any accumulated error due to the cut-off part in the pulse creation at this time point corresponding to the length "2×π×$R_o$".

Twentieth Embodiment

As is apparent from the aforementioned equation (7'''), assuming that the driving operation is started at the CLV disc format starting position "$R_o$", if the value "$R_o \times \theta_c$" is not set to the fundamental physical length so as to make the length equal to an integral multiple of the aforementioned fundamental clock (namely, if the cut-off part occurs at the time of creating the pulse), the error occurring at this time appears with the $R_o \times \theta_c \times n$ times thereof at the subsequent time n tracks later.

In the CLV disc format of the twentieth embodiment, since the value "$R_o \times \theta_c \times$" is set to the fundamental physical length so as to make the length equal to an integral multiple of the aforementioned fundamental clock. As to the twentieth embodiment, when the cut-off part does not occur with the finite decimal fraction, such case is also included in the embodiment. The track remaining difference at the time of creating the pulse becomes "0(zero)", at this time point. After starting the CLV drive, it is possible to obtain the CLV drive ordering pulse which does not cause any accumulated error due to the cut-off part in the pulse creation at this time point corresponding to the length "$R_o \times \theta_c$".

Twenty-First Embodiment

In the method of controlling the exposure drive of CLV disc format described in the fifteenth, seventeenth, and nineteenth embodiments in the optical disc master board exposing apparatus of the thirteenth or fourteenth embodiments, or in the method of controlling the exposure drive of the CLV disc format described in the sixteenth, eighteenth, and twentieth embodiments in the same optical disc master board exposing apparatus, as to the spindle drive ordering pulse on the CLV drive starting position or on the position of the first track or segment, or the second and subsequent tracks or segments, it is possible to create the ideal CLV drive ordering pulse not including any accumulated error.

Figure 20:
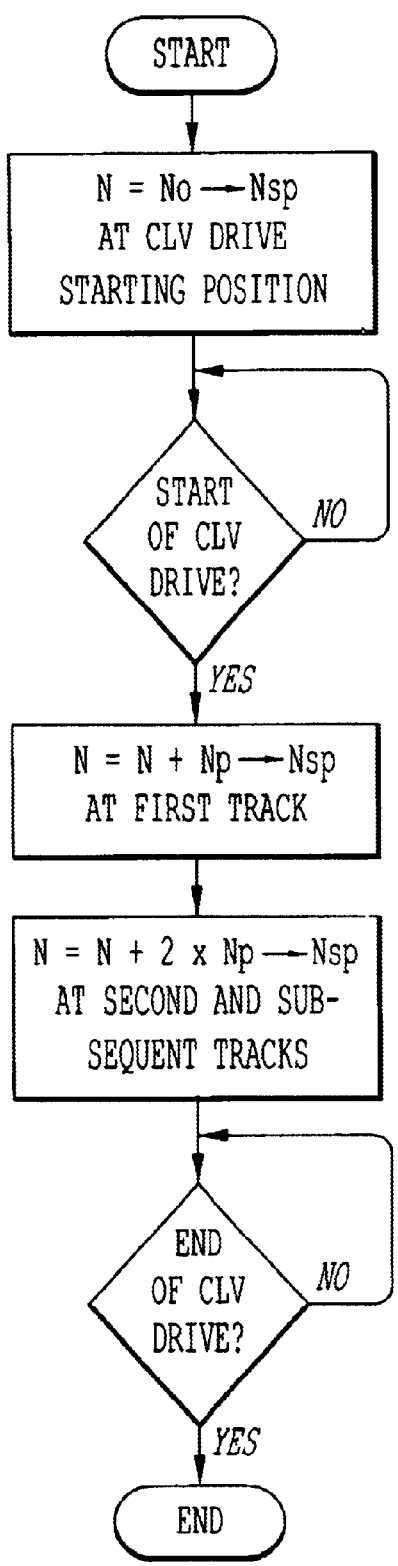
FIG. 20 is a flowchart for explaining the CLV drive control.
Figure 21:
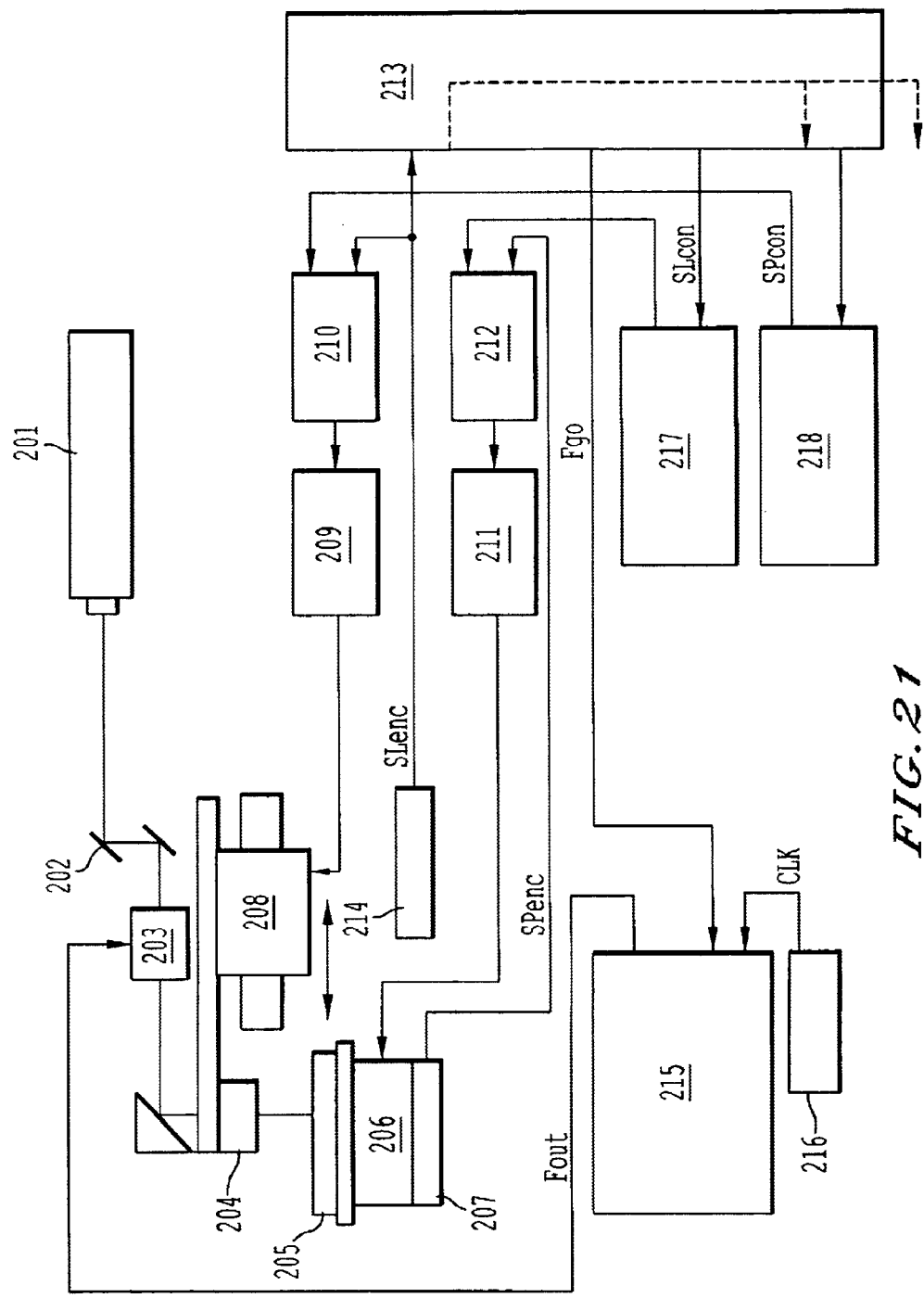
FIG. 21 is an explanatory block diagram for explaining the structure controlling the background-art CLV drive.

According to the exposing method of the twenty-first embodiments, the track positions of the entire access unit (sector, etc.) and the absolute and relative positions in the circular circumferential direction can be determined in the same meaning of dimension. The method of creating the drive ordering pulse at the time of controlling the CLV disc format exposure drive according to the fifteenth, seventeenth, and nineteenth embodiments illustrated in FIG. 25 (TABLE 3) and FIG. 20.

TABLE 3

| State of CLV Drive | Exposure Radius Position | Spindle Drive Ordering Pulse | Slider Drive Ordering Pulse |
|---|---|---|---|
| Stop | $R_0$ | $N_0 \rightarrow N_{sp}$ | $N_0 \rightarrow ns1$ |
| CLV Drive (Track 1) | ~$R_0$ + P | $N_0 + N_0 \rightarrow N_{sp}$ | $N_0 + N_p \rightarrow ns1$ |
| CLV Drive (Track 2) | ~$R_0$ + 2 P | $N_0 + 3 N_p \rightarrow N_{sp}$ | $N_0 + 3 N_p \rightarrow ns1$ |
| CLV Drive (Track 3) | ~$R_0$ + 3 P | $N_0 + 5 N_p \rightarrow N_{sp}$ | $N_0 + 5 N_p \rightarrow ns1$ |
| ... | ... | ...→... | ...→... |

At First, the CLV is moved onto the CLV drive starting position. Although a positioning error usually occurs on such positioning operation, it may be sufficient that the positioning accuracy is an extent of not departing from the line speed specification of the CLV disc format to be finally completed.

In the twenty-first embodiment of the invention, supposing that the position is deemed to be the ideal CLV drive starting radius RO, the pulses of Nsp are created from the pulse train of No . When the CLV drive control is started, the drive control for the first track is performed, namely, the pulses of Nsp are created from the pulse train of (No+Np) and thereby the spindle is driven. As to the drive control for the second and subsequent tracks, the spindle driving pulses of Nsp (per each of the respective tracks) are created in order from the pulse train added pulses of 2Np thereto per each of the respective tracks, wherein the pulses number is No+Np on the first track.

By creating the spindle drive ordering pulse in such way, the ideal CLV disc format exposing operation can be performed with small accumulated error immediately from the start of the CLV drive to the end thereof, at least for the CLV drive control of the spindle. As mentioned before, the track position of the access unit (sector, etc.) and the absolute and relative positions in the circular circumferential direction mainly depend on the CLV drive controlling accuracy of the spindle. Regarding the drive control of the slider, in general, the number of the pulses fed back from the linear scale (length-measuring system by use of the laser light, etc.) corresponding to the distance in the pitch direction per one track or per one segment is neither an integer nor a finite decimal fraction. In the twenty-first embodiment of the invention, the accumulative error is essentially included therein (in the CLV disc format exposing operation). The driving operation is performed by the pulse creating method according to the thirteenth and fourteenth embodiments.

Concerning the method of controlling the exposure drive of the CLV disc format described in the sixteenth, eighteenth, and twentieth embodiments, same operation can be also performed and same functional effect can be also obtained by replacing the term or numeral by the other one as follows:

Track→Segment,
$2 \times \pi \times P \rightarrow P \times \theta_c^2/(2 \times \pi)$,
$\pi \times P \rightarrow P \times \theta_c^2/(4 \times \pi)$,
$R_0 \rightarrow R_0 \times \theta_c$ Twenty-second Embodiment The twenty-second embodiment of the invention relates to the CLV disc format obtained by the exposing operation of exposing the CLV disc format described in the fifteenth, seventeenth, and nineteenth embodiments, or in the sixteenth, eighteenth, and twentieth embodiments by the method of controlling the CLV drive described in the twenty-first embodiment. The exposing operation is performed in the optical disc master board exposing apparatus described in the thirteenth and fourteenth embodiments.

The CLV disc format thus obtained as mentioned above is employed as CLV disc format media. In the above-mentioned CLV disc format media, the relationship of the absolute position on the disc of the access unit for the respective sectors formed on the disc, etc. or the relationship of the relative position between the access units, and the relationship of the angle in the circular circumferential direction are respectively equal to those of the arrangement on the ideal CLV disc format. The relative position relationship is the one of the track number. (It is not the one of the absolute radius position).

Summarized Description of the Thirteenth Through Twenty-second Embodiments

As is apparent from the foregoing description, the present invention can demonstrate the advantageous superior functional effects as mentioned hereinafter.

According to the thirteenth embodiment, in the drive ordering pulse creating method of the spindle and the slider, since the drive ordering pulse is created in synchronism with the fundamental clock of the CLV format per one revolution of the spindle, it is possible to obtain the drive ordering pulse train in which the accumulative error scarcely occurs for the ideal drive ordering pulse variation. In the CLV drive control of the present invention (the thirteenth embodiment), only the data on the drive starting position require the radius position data, and all of the subsequent data do not require the radius position data.

According to the fourteenth embodiment, in the drive ordering pulse creating method of the spindle and the slider, since the drive ordering pulse is created in synchronism with the fundamental clock of the CLV format per one segment, it is possible to obtain the drive ordering pulse train in which the accumulative error scarcely occurs for the ideal drive ordering pulse variation and the local error is very small.

According to the fifteenth embodiment, in the CLV disc format, since the length of $2 \times \pi \times P$ (P; pitch) becomes equal to an integral multiple of the fundamental clock, it is possible to obtain the drive ordering pulse train in which the accumulative error scarcely occurs for the ideal drive ordering pulse variation.

According to the sixteenth embodiment, in the CLV disc format, the length of $P \times \theta_c^2/(2 \times \pi)$, [P; pitch, $\theta_c$; segment angle] becomes equal to an integral multiple of the fundamental clock, it is possible to obtain the drive ordering pulse train in which the accumulative error scarcely occurs for the ideal drive ordering pulse variation.

According to the seventeenth embodiment, in the CLV disc format, the length of $\pi \times P$ (P; pitch) becomes equal to an integral multiple of the fundamental clock, it is possible to obtain the drive ordering pulse train in which any error does not occur at all for the ideal drive ordering pulse variation at the first track after starting the CLV drive.

According to the eighteenth embodiment, in the CLV disc format, the length of $P \times \theta_c^2/(2 \times \pi)$, [P; pitch, $\theta_c$; segment angle] becomes equal to the integer times of the fundamental clock, it is possible to obtain the drive ordering pulse train in which any error does not occur at all for the ideal drive ordering pulse variation at the first track after starting the CLV drive.

According to the nineteenth embodiment, in the CLV disc format, since the length of $2 \times \pi \times R_o$ is set to the fundamental physical length which is equal to an integral multiple of the fundamental clock, the remaining difference in the pulse creation becomes "0 (zero)" when the CLV drive is started. Consequently, it is possible to obtain the CLV drive ordering pulse not causing any accumulative error accompanying the cut-off part at the time of creating the pulse corresponding to the length of $2 \times \pi \times R_o$, after starting the CLV drive.

According to the twentieth embodiment, in the CLV disc format, since the length of $R_o \times \theta_c$ is set to the fundamental physical length which is equal to an integral multiple of the fundamental clock, the remaining difference in the pulse creation becomes "0 (zero)" when the CLV drive is started. Consequently, it is possible to obtain the CLV drive ordering pulse not causing any accumulative error accompanying the cut-off part at the time of creating the pulse corresponding to the length of $R_o \times \theta_c$, after starting the CLV drive.

According to the twenty-first embodiment, in the method of controlling the exposure drive of the CLV disc format in the optical disc master board exposing apparatus, since the ideal CLV drive ordering pulse without any accumulative error is created by the spindle drive ordering pulse on the CLV drive starting position and the first, second, and subsequent track positions and thereby the CLV exposing drive control is performed, the track position of the entire access units (sector, etc.) and the absolute and relative positions in the circular circumferential direction are determined in the same meaning of dimension.

According to the twenty-second embodiment, in the CLV disc format media obtained by the method of controlling the exposure drive of the CLV disc format described in the twenty-second embodiment, since the arrangement of the respective access units on the disc and the track number thereof respectively coincide with those of the ideal CLV format, it turns out to be possible to perform the accessing operation by use of the positional relationship.

The first through twenty-second embodiments of the present invention have been described heretofore. However, obviously, other numerous additional embodiments and modifications or variations of the present invention are possible in light of the above teachings. It is therefore to be understood that, within the scope of the appended claims, the present invention may be practiced otherwise than specifically described herein. Having now fully described the invention, it will be apparent to one of ordinary skill in the art that many changes and modifications can be made thereto without departing from the spirit and scope of the invention as set forth herein.

This document claims priority and contains subject matter related to Japanese Patent Application No. JPAP 10-325895 filed in the Japanese Patent Office on Oct. 29, 1998, Japanese Patent Application No. JPAP 11-071499 filed in the Japanese Patent Office on Mar. 17, 1999, Japanese Patent Application No. JPAP 11-160976 filed on Jun. 8, 1999, and Japanese Patent Application No. JPAP 11-327643 filed in the Japanese Patent Office on Nov. 18, 1999, and the entire contents of which are hereby incorporated by reference.

What is claimed as new and is desired to be secured by Letters Patent of United Stated is:

1. A constant linear velocity disc format for a spiral track having segments spaced from each other by a track pitch, said format providing each of the segments with a succession of sectors that each have a sector length that is integral multiple of $2 \times \pi \times$ the track pitch, wherein fixed-length track marks are provided so as to be respectively arranged at an equal physical length interval along said segments;

wherein each track mark of a present segment and each track mark of other segments adjacent thereto are detected; and wherein, by detecting said track marks of said present segment and said other segments adjacent thereto, information of positions of said segments is available.

2. The constant linear velocity disc format as defined in claim 1, wherein positional information of the present segment is obtained from information of a radius position of said present segment and information of a distance between said track marks of said other segments adjacent to said present segment.

3. The constant linear velocity disc format as defined in claim 1, wherein the fixed-length of said track marks is equal to an integer times 2×π×the track pitch, or equal to one divided by an integer times 2×π×the track pitch.

4. The constant linear velocity disc format as defined in claim 1, wherein the distance between said track marks defines a logical track length.

5. The constant linear velocity disc format as defined in claim 1, wherein the distance between said track marks is equal to a sector length.

6. The constant linear velocity disc format as defined in claim 1, wherein the distance between said track marks is equal to one divided by an integral multiple of a sector length.

7. The constant linear velocity disc format as defined in claim 1, wherein a code for specifying plural divided zones in which a distance between adjacent track marks in a radial direction of said disc is changed is provided on a present track mark.

8. The constant linear velocity disc format as defined in claim 2, wherein a code for specifying plural divided zones in which a distance between adjacent track marks in a radial direction of said disc is changed is provided on a present track mark.

9. The constant linear velocity disc format as defined in claim 3, wherein a code for specifying plural divided zones in which a distance between adjacent track marks in a radial direction of said disc is changed is provided on a present track mark.

10. The constant linear velocity disc format as defined in claim 4, wherein a code for specifying plural divided zones in which a distance between adjacent track marks in a radial direction of said disc is changed is provided on a present track mark.

11. The constant linear velocity disc format as defined in claim 5, wherein a code for specifying plural divided zones in which a distance between adjacent track marks in a radial direction of said disc is changed is provided on a present track mark.

12. The constant linear velocity disc format as defined in claim 6, wherein a code for specifying plural divided zones in which a distance between adjacent track marks in a radial direction of said disc is changed is provided on a present track mark.

13. A constant linear velocity disc format for a spiral groove track having groove track segments spaced from each other by a track pitch, said format providing each of the groove track segments with a succession of sectors that each have a sector length that is an integer times 2×π×the track pitch, wherein fixed-length track marks are provided so as to be respectively arranged at an equal physical length interval on land portions between the groove segments, wherein each track mark of a present groove segment and each track mark of groove segments adjacent thereto are detected, and wherein, by detecting said track marks of said present groove segment and said groove segments adjacent thereto, information of positions of said groove segments is available.

14. The constant linear velocity disc format as defined in claim 13, wherein positional information of the present groove segment is obtained from information of a radius position of said present groove segment and information of a distance between said track marks of said groove segments adjacent to said present groove segment.

15. The constant linear velocity disc format as defined in claim 13, wherein the fixed-length of said track marks is equal to an integer times 2×π×the track pitch, or equal to one divided by an integer times 2×π×the track pitch.

16. The constant linear velocity disc format as defined in claim 13, wherein the distance between said track marks is equal to a logical track length.

17. The constant linear velocity disc format as defined in claim 13, wherein the distance between said track marks is equal to a sector length.

18. The constant linear velocity disc format as defined in claim 13, wherein the distance between said track marks is equal to one divided by an integral multiple of a sector length.

19. The constant linear velocity disc format as defined in claim 13, wherein a code for specifying plural divided zones in which a distance between adjacent track marks in a radial direction of said disc is changed is provided on a present track mark.

20. The constant linear velocity disc format as defined in claim 14, wherein a code for specifying plural divided zones in which a distance between adjacent track marks in a radial direction of said disc is changed is provided on a present track mark.

21. The constant linear velocity disc format as defined in claim 15, wherein a code for specifying plural divided zones in which a distance between adjacent track marks in a radial direction of said disc is changed is provided on a present track mark.

22. The constant linear velocity disc format as defined in claim 16, wherein a code for specifying plural divided zones in which a distance between adjacent track marks in a radial direction of said disc is changed is provided on a present track mark.

23. The constant linear velocity disc format as defined in claim 17, wherein a code for specifying plural divided zones in which a distance between adjacent track marks in a radial direction of said disc is changed is provided on a present track mark.

24. The constant linear velocity disc format as defined in claim 18, wherein a code for specifying plural divided zones in which a distance between adjacent track marks in a radial direction of said disc is changed is provided on a present track mark.

25. A constant linear velocity optical disc having a track for recording information with a constant linear velocity, said track including track segments spaced from each other by a constant pitch with each track segment providing a predetermined data area, wherein each track segment has a railroad length that is an integral multiple of a length of a sector contained therein, wherein the length of each sector contained in each track segment is $2 \times \pi \times N$ times the track pitch, N being a positive integer, and wherein the head positions of said track segments are lined up on a predetermined radius line and spaced apart by said track pitch, wherein, in a spiral track of equal pitch formed by CLV driving, the railroad track length L of a spiral track turn is expressed by:

$$L = \pi \times (r^2 - Ro2)/P,$$

where, $$r = Ro + n \times P (n=1,2,3, \ldots);$$

wherein, Ro represents a radius position of starting the spiral track, r represents a radius position of the spiral track for measuring the railroad track length L, P represents the spiral track pitch, and n is a positive integer representing a number of track segments, and L can also be expressed as:

$$L = 2 \times \pi \times Ro \times n + n2 \times \pi \times P (n=1,2,3, \ldots);$$

wherein railroad track length Ln of respective spiral track turn segments can be expressed as:

$$Ln = 2 \times \pi \times Ro + (2 \times n - 1) \times \pi \times P (n=1,2,3 \ldots);$$

with a railroad track segment length difference between adjacent spiral track segments being a constant:

$$2 \times \pi \times P;$$

wherein, when a sector head position on each track segment is a standard position an increasing railroad track length (sumdLm) is obtained at a position preceded by m tracks and a relationship between the increasing railroad track length (sumdLm) and the other constants can be expressed as:

$$\mathrm{sum}dLm = 2 \times \pi \times P(1+2+3+ \ldots +m)$$

$$\mathrm{sum}dLm = \pi \times P \times m(m+1).$$

26. The constant linear velocity optical disc as defined in claim 25, wherein, when the railroad track segment length difference between adjacent track segments is $2 \times \pi \times P$ and further when a sector head position on a track turn is taken as a standard position, an increasing railroad track length (sumdLm) is obtained at a position preceded by m tracks and a relationship between the increasing railroad track length (sumdLm) and the other constants is:

$$\mathrm{sum}dLm = 2 \times \pi \times P(1+2+3+ \ldots +m)$$

$$\mathrm{sum}dLm = \pi \times P \times m(m+1);$$

wherein, when the sector head positions are arranged at equal track intervals on a radius line, sectors of integer number No are contained on an information area corresponding to an inner circumferential track segment no thereof and the sector length is an integer (Ns) times $2 \times \pi \times P$, the relationship between Lno, Ro, no, P, Ns, No, and the sector length can be expressed as:

$$Lno = 2 \times \pi \times Ro + (2 \times no - 1) \times \pi \times P$$

$$Lno = 2 \times \pi \times P \times Ns \times No, \text{ and}$$

$$2 \times \pi \times P \times Ns = [\text{Sector Length}];$$

wherein both Ns and No are integers and in a track segment (n−1), since the railroad track length difference from the track segment no to the track segment (n−1) is an integer times the sector length, the relationship between the constants is further:

$$(n-1-no) \times (n-no) = 2 \times Ns \times Nx;$$

wherein both Ns and Nx are integers, and furthermore, in the track segment n, the relationship therebetween can be expressed as:

$$Ln = 2 \times \pi \times Ro + (2 \times n - 1) \times \pi \times P$$

$$Ln = 2 \times \pi \times P \times Ns \times No';$$

wherein both Ns and No' are integers, the head positions of the sector are arranged on the same radius line and the following equations can be obtained:

$$2 \times \pi \times Ro = 2 \times \pi \times P \times Ns \times No - 2 \times \pi \times P \times no + \pi \times P, \text{ and}$$

$$n - no = Ns \times (No' - No);$$

wherein, when n−no is an integer M (n−no=M), then integers M, Nx, No', and No exist that satisfy:

$$M \times (M-1) = 2 \times Ns \times Nx, \text{ and}$$

$$M = Ns \times (No' - No);$$

wherein, there are further two cases in which Ns is odd or Ns is even;

wherein, when Ns is odd and M is equal to Ns, the following equation holds:

$$Ns \times (Ns-1) = Ns \times (2 \times Nx)$$

and the number Nx is:

$$Nx = (Ns-1)/2 = (\text{Odd Number})/2 = \text{Integral Number (Integer)},$$

and thereby, number Nx exists and also the following relationship (equation) can be obtained:

$(No'-No)=1$;

wherein, when Ns is an odd number, namely, the sector length is an odd number times $2\times\pi\times P$, the number Nx is arranged (lined up), at least, per M=Ns tracks, and furthermore, the number of the sectors contained in the track is incremented by "1" successively;

wherein, when Ns is an even number and M is equal to 2×Ns, the following equation holds:

$2\times Ns\times(2\times Ns-1)=2\times Ns\times Nx$, and the number Nx can be expressed as:

$Nx=2\times Ns-1=$Integral Number (Integer), and thereby, the number Nx exists and also satisfies the equation:

$(No'-No)=2$;

wherein, when Nx is an even number, namely, the sector length is an even number times $2\times\pi\times P$, the number Nx is arranged (lined up), at least, per M=2×Ns tracks, and furthermore, the number of the sectors contained in the track is incremented by "2" successively.

27. The constant linear velocity disc format as defined in claim 1, wherein, in a spiral track of equal pitch formed by the CLV driving, the railroad track length L of an entire track can be expressed by:

$L=\pi\times(r^2-Ro^2)/P$, and $r=Ro+n\times P(n=1,2,3,\ldots)$;

wherein Ro represents a radius position of starting a spiral track, r represents a radius position of the spiral track for measuring the railroad track length L, P represents the spiral track pitch, and n is a positive integer;

wherein L can be stated as:

$L=2\times\pi\times Ro\times n+n^2\times\pi\times P(n=1,2,3\ldots)$;

wherein, the railroad length Ln of respective spiral track segments can be expressed as:

$Ln=2\times\pi\times Ro+(2\times n-1)\times\pi\times P(n=1,2,3\ldots)$;

with a railroad track segment length difference between adjacent spiral track turns being a constant $2\times\pi\times P$ and when a sector head position on a track segment is a standard position, an increasing railroad track length (sumdLm) is obtained at a position preceded by m tracks and a the relationship between the increasing railroad track length (sumdLm) and the other constants is:

$\text{sum}dL_m=2\times\pi\times P(1+2+3+\ldots+m)$ $\text{sum}dL_m=\pi\times P\times m(m+1)$;

and when the sector head position on a track is also taken as the standard position and the adjacent track length difference of the increasing railroad track length (sumdLm) is obtained at the position preceding by m tracks the relationship between the adjacent track length difference and the other constants can be expressed as:

$dLm=\text{sum}dL_m-\text{sum}dL_m-1=2\times\pi\times P\times m$.

28. The constant linear velocity disc format as defined in claim 13, wherein, in a spiral track of equal pitch formed by CLV driving, the railroad track length L of an entire spiral track can be expressed as, $L=\pi\times(r_2-Ro_2)/P$, and $r=Ro+n\times P(n=1,2,3,\ldots)$;

wherein Ro represents the radius position of starting the spiral track, r represents the radius position of the spiral track for measuring the railroad track length L, P represents the spiral track pitch, and n is a positive integer that represents a number of segments of the spiral track with;

$L=2\times\pi\times Ro\times n+n^2\times\pi\times P(n=1,2,3\ldots)$;

wherein, railroad length Ln of respective track segments can be expressed as:

$Ln=2\times\pi\times Ro+(2\times n-1)\times\pi\times P(n=1,2,3\ldots)$;

with a railroad track segment length difference between adjacent spiral track segments being a constant $2\times\pi\times P$ and when a sector head position on each track segment is a standard position, an increasing railroad track length (sumdLm) is obtained at a position preceded by m tracks, the relationship between the increasing railroad track length (sumdLm) and the other constants is:

$\text{sum}dL_m=2\times\pi\times P(1+2+3+\ldots+m)$ $\text{sum}dL_m=\pi\times P\times m(m+1)$; and when the sector head position on a track is also the standard position and the adjacent track length difference of the increasing railroad track length (sumdL$_m$) is obtained at a position preceded by m tracks, a relationship exists between the adjacent track length difference and the other constants which can be expressed by:

$dL_m=\text{sum}dL_m-\text{sum}dL^m-1=2\times\pi\times P\times m$.

* * * * *